(12) United States Patent
Zhu et al.

(10) Patent No.: US 11,792,124 B2
(45) Date of Patent: Oct. 17, 2023

(54) ROUTING METHOD AND APPARATUS TO TRANSMIT DATA PACKETS TO NODES

(71) Applicant: HUAWEI TECHNOLOGIES CO., LTD., Guangdong (CN)

(72) Inventors: Yuanping Zhu, Shanghai (CN); Jing Liu, Shanghai (CN); Mingzeng Dai, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 238 days.

(21) Appl. No.: 17/098,103

(22) Filed: Nov. 13, 2020

(65) Prior Publication Data

US 2021/0067444 A1    Mar. 4, 2021

Related U.S. Application Data

(63) Continuation of application No. PCT/CN2019/082157, filed on Apr. 11, 2019.

(30) Foreign Application Priority Data

May 18, 2018 (CN) .......................... 201810482407.0

(51) Int. Cl.
*H04L 12/741* (2013.01)
*H04L 45/74* (2022.01)
(Continued)

(52) U.S. Cl.
CPC .............. *H04L 45/74* (2013.01); *H04L 45/16* (2013.01); *H04W 4/40* (2018.02)

(58) Field of Classification Search
CPC .......... H04L 45/74; H04L 45/16; H04W 4/40; H04W 4/06
See application file for complete search history.

(56) References Cited

U.S. PATENT DOCUMENTS 8,397,065 B2    3/2013   Lin et al.
8,855,115 B2    10/2014  Chen et al.
(Continued)

FOREIGN PATENT DOCUMENTS

CN    101568164 A    10/2009
CN    101651619 A    2/2010
(Continued)

OTHER PUBLICATIONS

Adnan M et al: "Multicast based Dual Amplify and Forward relay scheme for2-hop networks", Communications, 2009. LATINCOM'09. IEEE Latin-American Conference On, IEEE, Piscataway, NJ, USA, Sep. 10, 2009, pp. 1-5, XP031607657.

*Primary Examiner* — Walli Z Butt
(74) *Attorney, Agent, or Firm* — WOMBLE BOND DICKINSON (US) LLP

(57) ABSTRACT

Embodiments of this application provide a wireless communication method and apparatus. The method includes: receiving, by at least two forwarding nodes, a first data packet from a source node, where the first data packet includes service data, forwarding node set information of the first data packet, and destination node information; and a forwarding node set of the first data packet includes the at least two forwarding nodes, and the destination node information is used to identify a destination node set and/or a destination node; and sending, by at least one forwarding node in the at least two forwarding nodes, a second data packet, where the second data packet includes the service data, forwarding node set information of the second data packet, and the destination node information.

20 Claims, 12 Drawing Sheets

(51) Int. Cl.
 *H04W 4/40* (2018.01)
 *H04L 45/16* (2022.01)

(56) References Cited

U.S. PATENT DOCUMENTS

| | | |
|---|---|---|
| 2016/0308765 A1 | 10/2016 | Le et al. |
| 2017/0195218 A1 | 7/2017 | Schrum, Jr. et al. |
| 2018/0213365 A1* | 7/2018 | Yi .......................... H04W 4/06 |
| 2019/0149958 A1* | 5/2019 | Zhang .................. H04W 4/029 455/456.1 |
| 2020/0092685 A1* | 3/2020 | Fehrenbach .......... H04W 72/23 |
| 2020/0120458 A1* | 4/2020 | Aldana .................. H04W 4/08 |

FOREIGN PATENT DOCUMENTS

| | | |
|---|---|---|
| CN | 103648144 A | 3/2014 |
| CN | 105517098 A | 4/2016 |
| CN | 107342939 A | 11/2017 |
| CN | 107743047 A | 2/2018 |
| CN | 107113250 B | 8/2020 |
| DE | 102008054607 A1 | 7/2010 |

* cited by examiner

| Forwarding node set information of a first data packet | Destination node information | Service data |

FIG. 4A

| Forwarding node set information of a first data packet | Destination node information | Source node information of the first data packet | Information about a current node that sends the first data packet | Time information | Sequence number of the first data packet | Maximum quantity of forwarding times of service data | QoS requirement of the first data packet | Service data |
|---|---|---|---|---|---|---|---|---|

FIG. 4B

ROUTING METHOD AND APPARATUS TO TRANSMIT DATA PACKETS TO NODES

CROSS-REFERENCE TO RELATED APPLICATIONS

This application is a continuation of International Application No. PCT/CN2019/082157, filed on Apr. 11, 2019, which claims priority to Chinese Patent Application No. 201810482407.0, filed on May 18, 2018. The disclosures of the aforementioned applications are hereby incorporated by reference in their entireties.

TECHNICAL FIELD

This application relates to the field of communication technologies, and in particular, to a wireless communication method and an apparatus.

BACKGROUND

Currently, a vehicle may obtain road condition information or receive service information in time through vehicle to vehicle (V2V) communication, vehicle to infrastructure (V2I) communication, vehicle to pedestrian (V2P) communication, or vehicle to network (V2N) communication. These communication modes may be collectively referred to as V2X communication (where X represents everything). A network used for the V2X communication is referred to as the internet of vehicles.

Internet of vehicles communication based on a cellular network, for example, V2X communication based on long term evolution (LTE) or 5th generation (5G) new radio (NR), is currently an important communication means. In consideration of traffic safety factors, the V2X communication based on the cellular network has very high requirements on transmission reliability and real-time performance. For example, the V2X communication requires the transmission reliability of 99.999% and an ultra-low end-to-end delay of 1 ms. It can be learned that the V2X communication imposes an extremely high requirement on cellular network communication.

SUMMARY

Embodiments of this application provide a wireless communication method and an apparatus.

According to a first aspect, an embodiment of this application provides a wireless communication method, including:

receiving, by at least two forwarding nodes, a first data packet from a source node, where the first data packet includes service data, forwarding node set information of the first data packet, and destination node information; and a forwarding node set of the first data packet includes the at least two forwarding nodes, and the destination node information identifies a destination node set and/or a destination node; and sending, by at least one forwarding node in the at least two forwarding nodes, a second data packet, where the second data packet includes the service data, forwarding node set information of the second data packet, and the destination node information.

According to the method provided in this embodiment of this application, a multicast routing method in which routing information does not need to be maintained is introduced into a cellular wireless communications network, so that multi-hop transmission in the cellular wireless communications network is implemented, thereby resolving a problem that a distance of direct communication between terminals by using a single-hop link is relatively short.

In one embodiment, at least two forwarding nodes in the at least two forwarding nodes send a second data packet. In one embodiment, the destination node can obtain a plurality of received signals, thereby enhancing data receiving reliability of the destination node, and meeting a requirement on high-reliability receiving in the multi-hop transmission.

In one embodiment, the forwarding node set information of the first data packet identifies the forwarding node set of the first data packet.

In one embodiment, the forwarding node set information of the first data packet is a multicast or broadcast address of the forwarding node set of the first data packet.

In one embodiment, when the destination node information does not identify the at least one forwarding node in the at least two forwarding nodes, the at least one forwarding node in the at least two forwarding nodes receives the first data packet at a forwarding protocol layer and a protocol layer below the forwarding protocol layer, where the forwarding protocol layer is any one of the following: a media access control (MAC) protocol layer, a radio link control (RLC) protocol layer, a packet data convergence protocol (PDCP) protocol layer, and a service data adaptation protocol (SDAP) protocol layer. For example, the forwarding protocol layer is the MAC protocol layer. The at least one forwarding node in the at least two forwarding nodes receives the first data packet at the MAC protocol layer and a protocol layer below the MAC protocol layer, and does not need to further parse out the service data in the first data packet, so that a processing procedure is simplified and security protection on the service data at the forwarding node is improved.

In one embodiment, when the destination node information identifies the at least one forwarding node in the at least two forwarding nodes, the at least one forwarding node in the at least two forwarding nodes receives the first data packet at a forwarding protocol layer and a protocol layer below the forwarding protocol layer, and the at least one forwarding node in the at least two forwarding nodes obtains the service data at a protocol layer above the forwarding protocol layer, where the forwarding protocol layer is any one of the following: a media access control (MAC) protocol layer, a radio link control (RLC) protocol layer, a packet data convergence protocol (PDCP) protocol layer, and a service data adaptation protocol (SDAP) protocol layer. For example, the forwarding protocol layer is the MAC protocol layer. The at least one forwarding node in the at least two forwarding nodes receives the first data packet at the MAC protocol layer and a protocol layer below the MAC protocol layer, and obtains the service data at a protocol layer (for example, the RLC protocol layer and/or the PDCP protocol layer) above the MAC protocol layer, to successfully parse out and forward the service data when a node is both a forwarding node and a destination node.

In one embodiment, the first data packet includes time information, and the time information includes valid time information of the service data and/or sending time information of the second data packet. The valid time information of the service data is used to identify a valid time of the service data. The at least one forwarding node in the at least two forwarding nodes may determine, based on the valid time information of the service data, whether the service data is valid at a current time. The sending time information of the second data packet is used to identify a sending time of the second data packet. The at least one forwarding node in the at least two forwarding nodes may determine the sending time of the second data packet based on the sending time information of the second data packet.

In one embodiment, the time information includes the valid time information of the service data. The at least one forwarding node in the at least two forwarding nodes determines, based on the valid time information of the service data, that the service data in the first data packet is valid, and sends the second data packet. In one embodiment, it can be ensured that the service data received or forwarded by the forwarding node is valid, thereby preventing the destination node from receiving invalid service data, and preventing an air interface resource waste caused by forwarding the invalid service data.

In one embodiment, the time information includes the valid time information of the service data. The at least one forwarding node in the at least two forwarding nodes determines, based on the valid time information of the service data, that the service data in the first data packet is valid, and stores the service data. In one embodiment, the forwarding node no longer needs to obtain the service data from a previous-hop node when the service data needs to be retransmitted or re-forwarded, thereby increasing a forwarding speed.

In one embodiment, the time information includes the sending time information of the second data packet. The at least one forwarding node in the at least two forwarding nodes determines the sending time of the second data packet based on the sending time information of the second data packet. This embodiment may be used to instruct a node to send the second data packet at a predetermined time. For example, for service data insensitive to a delay or service data not with a high delay requirement, the sending time information of the second data packet may be used to instruct the node to send the second data packet when an air interface resource is idle. In this way, utilization of the air interface resource is improved. Alternatively, this embodiment may be used to coordinate time of collaborative forwarding performed by a plurality of nodes, so that the destination node can receive forwarded service data more accurately, thereby increasing a collaboration gain.

In one embodiment, the time information includes the sending time information of the second data packet. The at least one forwarding node in the at least two forwarding nodes determines, based on the sending time information of the second data packet, that the sending time of the second data packet has not arrived, and stores the service data in the second data packet. In one embodiment, when obtaining the service data in the second data packet before the sending time of the second data packet, the forwarding node may store the service data, to directly send the service data after the sending time of the second data packet arrives, thereby increasing a speed of forwarding the service data.

In one embodiment, the second data packet includes time information, and the time information includes valid time information of the service data. The valid time information of the service data is used to identify a valid time of the service data. At least one destination node in the destination node set and/or the destination node may determine, based on the valid time information of the service data, whether the service data is valid at a current time.

In one embodiment, the first data packet includes a sequence number of the first data packet, and the sequence number of the first data packet is used to identify or index the first data packet.

In one embodiment, the first data packet includes the sequence number of the first data packet. The at least one forwarding node in the at least two forwarding nodes determines, based on the sequence number of the first data packet, that the service data in the first data packet has not been forwarded, and sends the second data packet. In one embodiment, the forwarding node can be prevented from repeatedly forwarding same service data, thereby improving forwarding efficiency, and preventing an air interface resource waste caused by repeated forwarding.

In one embodiment, the second data packet includes a sequence number of the second data packet, and the sequence number of the second data packet is used to identify or index the second data packet.

In one embodiment, the first data packet includes source node information of the first data packet, and the source node information of the first data packet identifies the source node.

In one embodiment, the first data packet includes the sequence number of the first data packet and the source node information of the first data packet. The at least one forwarding node in the at least two forwarding nodes determines, based on the sequence number of the first data packet and the source node information of the first data packet, that the service data in the first data packet has not been forwarded, and sends the second data packet. In one embodiment, the forwarding node can be prevented from repeatedly forwarding same service data, thereby improving forwarding efficiency, and preventing an air interface resource waste caused by repeated forwarding.

In one embodiment, the first data packet includes the sequence number of the first data packet and the source node information of the first data packet. The at least one forwarding node in the at least two forwarding nodes determines, based on the sequence number of the first data packet, the source node information of the first data packet, and the destination node information included in the first data packet, that the service data in the first data packet has not been forwarded, and sends the second data packet. In one embodiment, the forwarding node can be prevented from repeatedly forwarding same service data, thereby improving forwarding efficiency, and preventing an air interface resource waste caused by repeated forwarding.

In one embodiment, the second data packet includes source node information of the second data packet, and the source node information of the second data packet identifies the source node.

In one embodiment, the first data packet includes a maximum quantity of forwarding times of the service data, and the maximum quantity of forwarding times of the service data is used to determine a quantity of times that the service data is allowed to be forwarded.

In one embodiment, the first data packet includes the maximum quantity of forwarding times of the service data. The at least one forwarding node in the at least two forwarding nodes determines that the maximum quantity of forwarding times of the service data is greater than zero, and sends the second data packet. In one embodiment, an appropriate quantity of forwarding times of the service data can be controlled, thereby preventing an air interface resource waste caused because the service data is forwarded for an excessively large quantity of times.

In one embodiment, the first data packet includes the maximum quantity of forwarding times of the service data. The at least one forwarding node in the at least two forwarding nodes determines that the maximum quantity of forwarding times of the service data is greater than zero, and sends the second data packet. In addition, the second data packet includes a maximum quantity of forwarding times of the service data, and the maximum quantity of forwarding times of the service data included in the second data packet satisfies an equation: "the maximum quantity of forwarding times of the service data included in the second data packet=the maximum quantity of forwarding times of the service data included in the first data packet−1". In one embodiment, an appropriate quantity of forwarding times of the service data can be controlled, thereby preventing an air interface resource waste caused because the service data is forwarded for an excessively large quantity of times.

In one embodiment, the second data packet includes a maximum quantity of forwarding times of the service data, and the maximum quantity of forwarding times of the service data is used to determine a quantity of times that the service data is allowed to be forwarded.

In one embodiment, the first data packet includes information about a current node that sends the first data packet, and the information about the current node that sends the first data packet identifies a node that sends the first data packet. For example, the information about the current node that sends the first data packet identifies the source node. In one embodiment, reverse routing information can be obtained more conveniently. In one embodiment, a node can directly obtain information about a previous-hop node (namely, the source node) of the node (for example, address information of the previous-hop node). In this way, when the node needs to send information to the previous-hop node (namely, the source node) of the node, the node may directly use the information about the previous-hop node (namely, the source node), thereby improving route selection efficiency.

In one embodiment, the second data packet includes information about a current node that sends the second data packet, the information about the current node that sends the second data packet identifies one forwarding node in the at least two forwarding nodes, and the forwarding node is a forwarding node that sends the second data packet. In one embodiment, reverse routing information can be obtained more conveniently. In one embodiment, a node can directly obtain information about a previous-hop node (namely, the node that sends the second data packet) of the node (for example, address information of the previous-hop node). In this way, when the node needs to send information to the previous-hop node (namely, the node that sends the second data packet) of the node, the node may directly use the information about the previous-hop node (namely, the node that sends the second data packet), thereby improving route selection efficiency.

In one embodiment, the first data packet includes a QoS requirement of the first data packet, and the QoS requirement of the first data packet identifies a priority requirement and/or a reliability requirement of the service data in the first data packet.

In one embodiment, the second data packet includes a QoS requirement of the second data packet, and the QoS requirement of the second data packet identifies a priority requirement and/or a reliability requirement of the service data in the second data packet.

In one embodiment, the forwarding node set information of the second data packet further identifies a non-destination node set and/or a non-destination node, and the non-destination node set includes at least one non-destination node. In one embodiment, the forwarding node set information of the second data packet identifies the destination node set and the non-destination node set. Further, optionally, at least one non-destination node included in the non-destination node set receives the second data packet, and sends, to the destination node, a third data packet including the service data in the second data packet. In one embodiment, an amount of the service data received by the destination node and/or signal strength of receiving the service data by the destination node can be further increased, thereby improving data transmission reliability.

In one embodiment, the at least one forwarding node in the at least two forwarding nodes stores the service data before learning that the second data packet is correctly received by the at least one destination node in the destination node set and/or the destination node. In one embodiment, the forwarding node can temporarily store the service data before the destination node successfully receives the service data, so that the forwarding node no longer needs to obtain the service data from the previous-hop node when the service data needs to be retransmitted or re-forwarded, thereby increasing a forwarding speed.

According to a second aspect, an embodiment of this application provides a wireless communication method, including:

sending, by a source node, a first data packet, where the first data packet includes service data, forwarding node set information of the first data packet, and destination node information; and a forwarding node set of the first data packet includes at least two forwarding nodes, and the destination node information identifies a destination node set and/or a destination node.

In one embodiment, the source node receives indication information sent by a network device, and determines the forwarding node set information of the first data packet based on the indication information.

In one embodiment, the indication information includes a multicast or broadcast address of the forwarding node set of the first data packet.

According to the method provided in this embodiment of this application, a multicast routing method in which routing information does not need to be maintained is introduced into a cellular wireless communications network, so that multi-hop transmission in the cellular wireless communications network is enabled, thereby helping resolving a problem that a distance of direct communication between terminals by using a single-hop link is relatively short.

According to a third aspect, an embodiment of this application provides a wireless communication method, including:

sending, by a network device, indication information, where the indication information is used by a source node to determine forwarding node set information of a first data packet.

In one embodiment, the indication information includes a multicast or broadcast address of a forwarding node set of the first data packet.

According to the method provided in this embodiment of this application, a multicast routing method in which routing information does not need to be maintained is introduced into a cellular wireless communications network, so that multi-hop transmission in the cellular wireless communications network is enabled, thereby laying a foundation for resolving a problem that a range of direct communication between terminals by using a single-hop link is poor.

According to a fourth aspect, an embodiment of this application provides a communications device. The communications device has a function of implementing the forwarding node in the first aspect. For example, the communications device includes modules, units, or means (means) corresponding to the operations performed by the forwarding node in the first aspect, and the functions, units, or means (means) may be implemented by software, may be implemented by hardware, or may be implemented by hardware executing corresponding software. Alternatively, the communications device has a function of implementing the source node in the second aspect, or has a function of implementing the network device in the third aspect.

According to a fifth aspect, an embodiment of this application provides a communications device, including a processor and a memory, where the memory is configured to store a program, and when the program is executed by the processor, the communications device is enabled to perform the method according to any one of the first aspect, the second aspect, or the third aspect, or any embodiment thereof.

According to a sixth aspect, an embodiment of this application provides a storage medium, storing a computer program, where when the computer program is executed by a processor, the method according to any one of the first aspect, the second aspect, or the third aspect, or any embodiment thereof is implemented.

According to a seventh aspect, an embodiment of this application provides a chip system, including a processor, configured to support a communications device in implementing the method according to any one of the first aspect, the second aspect, or the third aspect, or any embodiment thereof.

According to an eighth aspect, an embodiment of this application provides a communications system, including the communications device according to the fourth aspect or the fifth aspect, or the storage medium according to the sixth aspect.

BRIEF DESCRIPTION OF DRAWINGS

FIG. 4A is a schematic diagram of a first data packet according to an embodiment of this application;

FIG. 4B is a schematic diagram of another first data packet according to an embodiment of this application;

DESCRIPTION OF EMBODIMENTS

Figure 1:
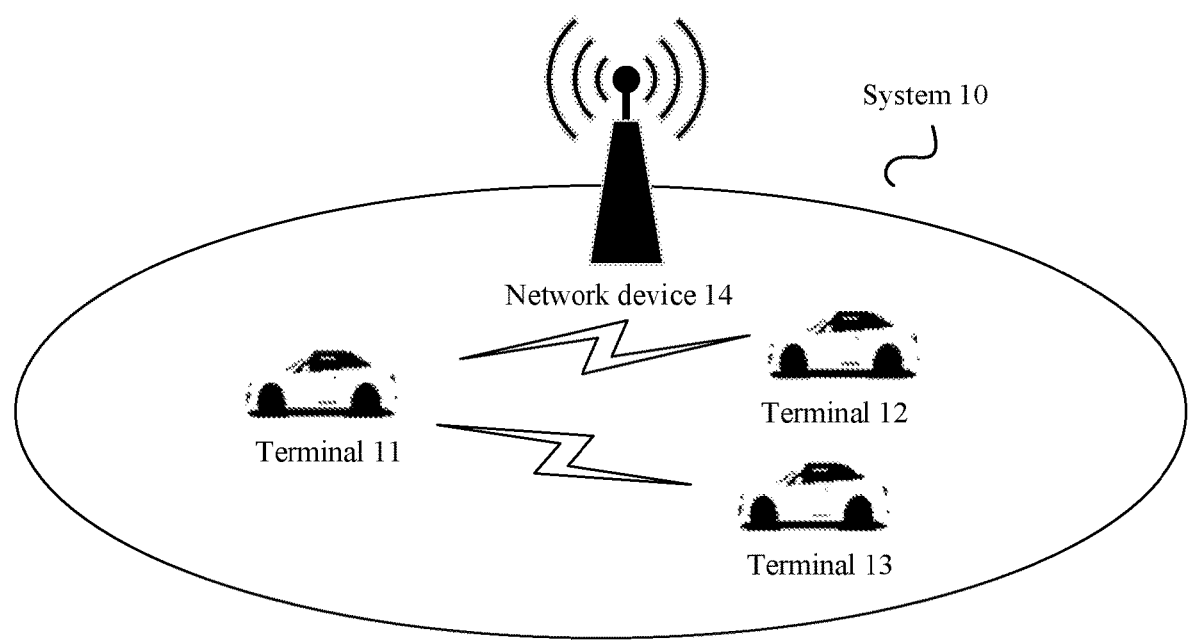
FIG. 1 is a schematic block diagram of a communications system used in this application.

A routing method and an apparatus provided in embodiments of the present application may be used in a communications system. First, the communications system applicable to the embodiments of this application is briefly described with reference to FIG. 1. FIG. 1 is a schematic diagram of a system 10 applicable to an embodiment of this application. The system shown in FIG. 1 may be a V2X communications system. As shown in FIG. 1, the communications system 10 includes at least three terminals, for example, a terminal 11, a terminal 12, and a terminal 13. The terminal 11 and the terminal 12 may communicate with each other by using a direct link, and the terminal 11 and the terminal 13 may communicate with each other by using a direct link. In other words, the terminal 11 and the terminal 12 may directly communicate with each other without network-side relay. The terminal 11 and the terminal 13 may directly communicate with each other without network-side relay. In one embodiment, the system 10 may further include a network device 14, and the network device 14 may perform data communication with each terminal by using a wireless connection.

The technologies described in the embodiments of the present application may be applied to various communications systems, for example, 2G, 3G, 4G, 4.5G, and 5G communications systems, a system in which a plurality of communications systems are integrated, or a future evolved network. The communications system is, for example, a code division multiple access (CDMA) system, a wideband code division multiple access (WCDMA) system, a time division multiple access (TDMA) system, a frequency division multiple access (FDMA) system, an orthogonal frequency-division multiple access (OFDMA) system, a single carrier frequency division multiple access (SC-FDMA) system, a long term evolution (LTE) system, a new radio (NR) system, a wireless fidelity (Wi-Fi) system, a worldwide interoperability for microwave access (WiMAX) system, a 3rd generation partnership project (3GPP) related cellular system, and another such communications system.

In this application, the network device may be any device with wireless receiving and sending functions. The network device includes but is not limited to: a base transceiver station (BTS) in global system for mobile communications (GSM) or CDMA, a NodeB (NodeB) in WCDMA, an evolved NodeB (NodeB or eNB or e-NodeB, evolutional Node B) in LTE, a base station (gNodeB or gNB) or a transmission reception point (TRP) in NR, a subsequently evolved base station in 3GPP, an access node in a Wi-Fi system, a wireless relay node, a wireless backhaul node, or the like. The base station may be a macro base station, a micro base station, a picocell base station, a small cell, a relay station, or the like. A plurality of base stations can support networks using a same technology mentioned above, or may support networks using different technologies mentioned above. The base station may include one or more co-site or non-co-site transmission reception points (TRP). The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with the terminal, or may communicate with the terminal by using a relay station. The terminal may communicate with a plurality of base stations using different technologies. For example, the terminal may communicate with a base station supporting an LTE network, or communicate with a base station supporting a 5G network, or may support a dual connection to a base station in an LTE network and a base station in a 5G network.

The terminal is a device with wireless receiving and sending functions. The terminal may be deployed on land, indoor or outdoor, or may be hand-held, wearable, or vehicle-mounted; may be deployed on a water surface (for example, on a ship); or may be deployed in the air (for example, in an airplane, a balloon, or a satellite). The terminal may be a mobile, a tablet computer (Pad), a computer with wireless receiving and sending functions, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal sometimes may also be referred to as a terminal device, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communications device, a UE agent, a UE apparatus, or the like. The terminal may be fixed or movable.

In an existing V2V mode of LTE-based V2X communication, a distance of direct communication between vehicle-mounted terminals is within 300 meters. However, in a V2V mode of NR V2X communication, a requirement on a distance of communication between vehicle-mounted terminals is extended to 1000 meters, and an end-to-end delay is required to be less than 1 millisecond (ms). In direct communication between vehicle-mounted terminals without using a network device, the foregoing requirement on the end-to-end delay can be met. However, because transmit power of the vehicle-mounted terminals is limited, a distance of the direct communication between the vehicle-mounted terminals by using a single-hop link cannot meet the foregoing new requirement.

According to the routing method and the apparatus provided in the embodiments of this application, a multicast routing method in which routing information does not need to be maintained is introduced into a cellular wireless communications network, so that high-reliable multi-hop transmission in the cellular wireless communications network is implemented, thereby resolving a problem that a distance of direct communication between terminals by using a single-hop link is relatively short.

The following describes the technical solutions of this application in detail by using embodiments with reference to the accompanying drawings. The following several embodiments may be combined with each other, and same or similar concepts or processes may not be described repeatedly in some embodiments.

Figure 2:
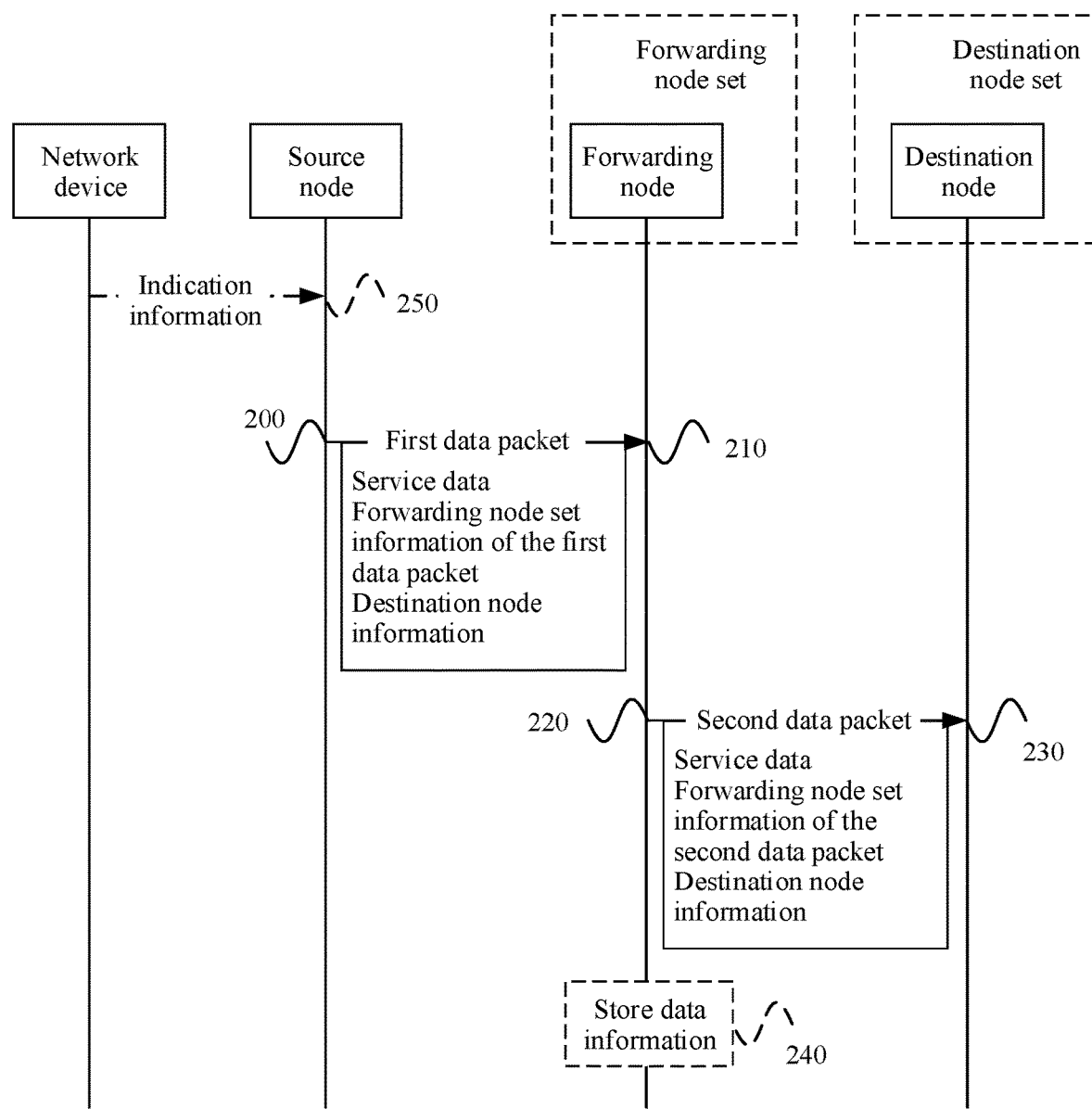
FIG. 2 is a schematic flowchart of a wireless communication method according to an embodiment of this application.

FIG. 2 is a flowchart of a routing method according to an embodiment of this application. As shown in FIG. 2, the method in this embodiment may include the following operations.

Part 200: A source node sends a first data packet, where the first data packet includes service data, forwarding node set information of the first data packet, and destination node information; and a forwarding node set of the first data packet includes at least two forwarding nodes, and the destination node information identifies a destination node set and/or a destination node. In one embodiment, this embodiment of this application may include part 250 in FIG. 2. That is, the source node receives indication information sent by a network device, and determines the forwarding node set information of the first data packet based on the indication information.

Part 210: The at least two forwarding nodes receive the first data packet from the source node, where the first data packet includes the service data, the forwarding node set information of the first data packet, and the destination node information; and the forwarding node set of the first data packet includes the at least two forwarding nodes, and the destination node information identifies the destination node set and/or the destination node.

Part 220: At least one forwarding node in the at least two forwarding nodes sends a second data packet, where the second data packet includes the service data, forwarding node set information of the second data packet, and destination node information.

Part 230: At least one destination node in the destination node set and/or the destination node receives the second data packet.

The nodes (namely, the source node, the forwarding node, and the destination node) in this embodiment of this application may be terminals, or may be network devices. The following separately describes the foregoing parts with reference to embodiments by using an example in which the node is a terminal.

In part 200, the source node needs to send the service data to at least one destination node, and the at least one destination node is included in the destination node set. It may be understood that, when the service data of the source node needs to be sent to only one destination node, the destination node may not belong to the destination node set. A type of the service data is not limited in this embodiment of this application. It may be understood that the service data may be understood as service data that the source node expects to transmit to the destination node. For example, in an internet of vehicles scenario, the service data may be sensor information or control information sent by a vehicle-mounted terminal to another vehicle-mounted terminal. For another example, in an industrial control scenario, the service data may be sensor information or control information sent by an industrial control terminal to another industrial control terminal. When no ambiguity is caused, the service data may have another name. For example, the name may be any one of the following: data information, a data bit, a data information bit, original information, original data, and a data payload (payload). This is not limited herein.

With reference to a scenario considered in this application, the destination node is located outside a communication range of the source node. In one embodiment, a signal sent by the source node cannot be received by the at least one destination node. Therefore, in this embodiment of this application, a multi-hop transmission method is used. The service data of the source node is forwarded to the destination node by using the forwarding node, so that the destination node located outside the communication range of the source node can receive the service data.

In one embodiment, the source node sends a first data packet, where the first data packet includes service data, forwarding node set information of the first data packet, and destination node information. The destination node information identifies a destination node set and/or a destination node. The destination node set includes at least one destination node; and the destination node may be understood as a node at which the service data in the first data packet finally needs to arrive. The forwarding node set information of the first data packet identifies a forwarding node set of the first data packet, the forwarding node set of the first data packet includes at least two forwarding nodes, and the forwarding node may be understood as a relay node that forwards the service data to the destination node.

Figure 3A:
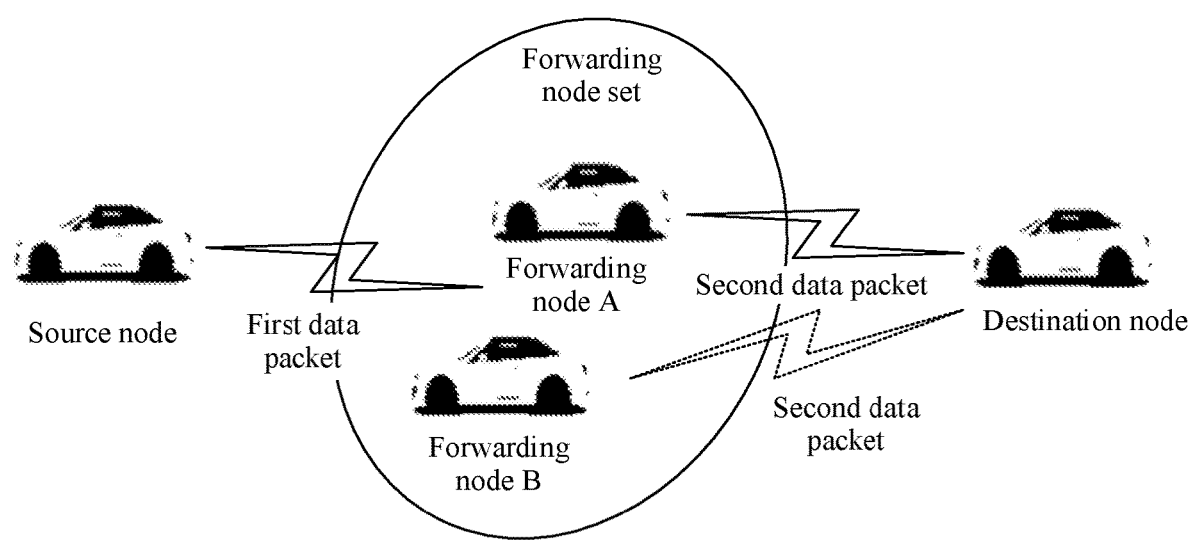
FIG. 3A is a schematic diagram of a scenario to which an embodiment of this application is applicable.

In node distribution shown in FIG. 3A as an example, there is one destination node. In this case, the destination node information identifies the destination node or identifies a destination node set including the destination node. For example, the destination node information may be an address of the destination node (for example, a unicast address of the destination node), or may be an address of the destination node set including the destination node (for example, a multicast or broadcast address of the destination node set). If the forwarding node set includes two forwarding nodes (namely, a forwarding node A and a forwarding node B), the forwarding node set information of the first data packet identifies the forwarding node set of the first data packet. For example, the forwarding node set information of the first data packet may be an address of the forwarding node set of the first data packet (for example, a multicast or broadcast address of the forwarding node set of the first data packet).

Figure 3B:
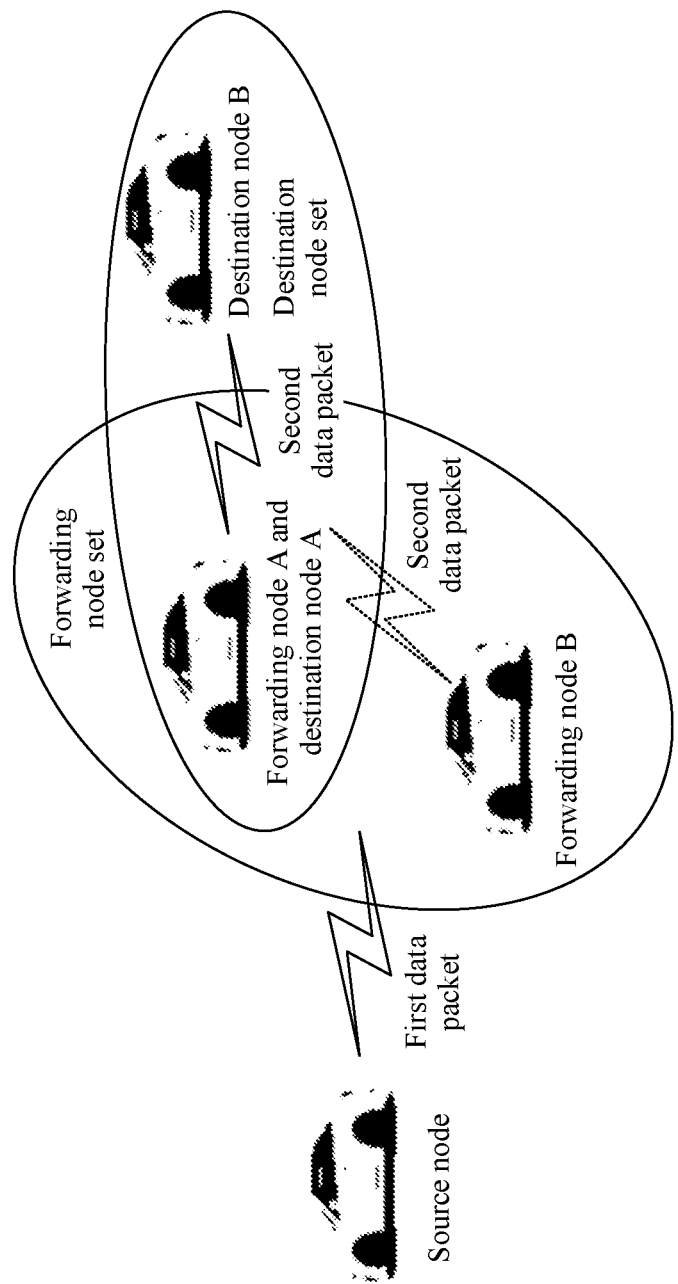
FIG. 3B is a schematic diagram of another scenario to which an embodiment of this application is applicable.

In node distribution shown in FIG. 3B as an example, there are two destination nodes (a destination node A and a destination node B). In this case, the destination node information identifies the destination node set. For example, the destination node information may be an address of the destination node set (for example, a multicast or broadcast address of the destination node set). If the forwarding node set includes two forwarding nodes (namely, a forwarding node A and a forwarding node B), where the forwarding node A and the destination node A are a same node in the example in FIG. 3B, the forwarding node set information of the first data packet identifies the forwarding node set of the first data packet. For example, the forwarding node set information of the first data packet may be an address of the forwarding node set of the first data packet (for example, a multicast or broadcast address of the forwarding node set of the first data packet).

The unicast address in this embodiment of this application may be an internet protocol (IP) unicast address, a physical (PHY) unicast address, a media access control (MAC) unicast address, a radio link control (RLC) unicast address, a packet data convergence protocol (PDCP) unicast address, a service data adaptation protocol (SDAP) unicast address, or the like. The unicast address in this embodiment of this application may alternatively be a unicast address of a newly added protocol layer (for example, an adaptation layer). The unicast address in this embodiment of this application may be a node identifier, a node index, a node ID, or the like. The unicast address is, for example, an international mobile subscriber identity (IMSI) of a terminal, a temporary identifier (for example, a temporary mobile subscriber identity (TMSI), or a cell radio network temporary identifier (C-RNTI)) of a terminal, or a proximity service (Prose) UE ID of a terminal. The unicast address in this embodiment of this application may alternatively be location information of a node, for example, an identifier of a cell in which a terminal is located, an identifier of a tracking area in which a terminal is located, an identifier of a routing area in which a terminal is located, an identifier of an access network notification area in which a terminal is located, or geographical location coordinate information of a terminal.

The multicast/broadcast address in this embodiment of this application may be an IP multicast address, an IP broadcast address, a PHY multicast address, a PHY broadcast address, a MAC multicast address, a MAC broadcast address, an RLC multicast address, an RLC broadcast address, a PDCP multicast address, a PDCP broadcast address, an SDAP multicast address, an SDAP broadcast address, or the like. The multicast/broadcast address in this embodiment of this application may alternatively be a multicast address or a broadcast address of a newly added protocol layer (for example, an adaptation layer). The multicast/broadcast address in this embodiment of this application may alternatively be a node group identifier, a node cluster identifier, a node group index, a node cluster index, a node group ID, a node cluster ID, or the like. For example, the multicast/broadcast address is an IMSI of a terminal group, an IMSI of a terminal cluster, a temporary identifier (for example, a temporary mobile group identity (TMGI), or a group radio network temporary identifier (G-RNTI)) of a terminal group, a temporary identifier (for example, a temporary mobile group identity (TMGI), or a group radio network temporary identifier (G-RNTI)) of a terminal cluster, a prose UE group ID of a terminal group, or a prose UE group ID of a terminal cluster. The multicast/broadcast address in this embodiment of this application may alternatively be location information of a node group or location information of a node cluster, for example, an identifier of a cell group in which a terminal group/terminal cluster is located, an identifier of a cell cluster in which a terminal group/terminal cluster is located, an identifier of a tracking area group/tracking area cluster in which a terminal group is located, an identifier of a tracking area group/tracking area cluster in which a terminal cluster is located, an identifier of a routing area group/routing area cluster in which a terminal group is located, an identifier of a routing area group/routing area cluster in which a terminal cluster is located, an identifier of an access network notification area group/access network notification area cluster in which a terminal group is located, an identifier of an access network notification area group/access network notification area cluster in which a terminal cluster is located, an identifier of a broadcast service area in which a terminal group is located, an identifier of a broadcast service area in which a terminal cluster is located, geographical location coordinate information of a terminal group, or geographical location coordinate information of a terminal cluster.

FIG. 4A shows a format of the first data packet. The format of the first data packet includes three fields, which respectively carry the forwarding node set information of the first data packet, the destination node information, and the service data. It should be noted that an arrangement order of the fields in the format of the first data packet is not limited in this embodiment of this application. For example, an arrangement order may be: the forwarding node set information of the first data packet, the destination node information, and the service data, or the destination node information, the forwarding node set information of the first data packet, and the service data. It may be understood that lengths of the fields in the format of the first data packet shown in FIG. 4A are merely used as an example.

In one embodiment, the first data packet may further include any one or more of time information, a sequence number of the first data packet, a maximum quantity of forwarding times of the service data, source node information of the first data packet, information about a current node that sends the first data packet, or a quality of service (QoS) requirement of the first data packet.

The time information includes valid time information of the service data and/or sending time information of the second data packet. The valid time information of the service data is used to identify a valid time of the service data. A node may determine, based on the valid time information of the service data, whether the service data is valid at a current time. The sending time information of the second data packet is used to identify a sending time of the second data packet. The second data packet is a data packet sent by the forwarding node to the destination node. The second data packet is described in more detail in part 220 and part 230. The node may determine the sending time of the second data packet based on the sending time information of the second data packet. The time information may be information about an absolute time, for example, a universal time coordinated (UTC) time or a global positioning system (GPS) time, or may be information about a relative time, for example, a GPS clock offset, or a relative SFN (SFN) offset that uses a system frame number that is broadcast by a network as a reference. The time information may further include other time information, for example, generation time information of the first data packet.

The sequence number of the first data packet is used to identify or index the first data packet, so that a receiving node performs repeated detection based on the sequence number, to prevent repeatedly forwarding the service data that has been sent and that is included in the first data packet, or to prevent repeatedly receiving the service data that has been received and that is included in the first data packet. In one embodiment, the sequence number of the first data packet is generated by the source node and is included in the first data packet, and when forwarding the service data included in the first data packet, the forwarding node does not change the sequence number of the first data packet. In other words, it may be understood as that when the forwarding node forwards the second data packet including the service data, a sequence number of the second data packet is the same as the sequence number of the first data packet.

The maximum quantity of forwarding times of the service data is used by the forwarding node to determine a quantity of times that the service data is allowed to be forwarded. For example, the maximum quantity of forwarding times of the service data is 2. The forwarding node determines, based on the maximum quantity of forwarding times of the service data, that the service data is allowed to be forwarded twice. For example, the maximum quantity of forwarding times of the service data is 0. The forwarding node determines, based on the maximum quantity of forwarding times of the service data, that the service data cannot be forwarded anymore. In one embodiment, the forwarding node may further interpret the maximum quantity of forwarding times of the service data as other pre-definitions, and then determine the quantity of times that the service data is allowed to be forwarded. For example, a predefined interpretation manner is "the maximum quantity of forwarding times of the service data minus 1". For example, the maximum quantity of forwarding times of the service data is 2. The forwarding node determines, based on the maximum quantity of forwarding times of the service data and with reference to the predefined interpretation manner in the foregoing example, that the service data is allowed to be forwarded once.

The source node information of the first data packet identifies the source node. For example, the source node information of the first data packet may be a unicast address of the source node.

The information about the current node that sends the first data packet identifies a node that sends the first data packet. In one embodiment, the information about the current node that sends the first data packet identifies the source node. For example, the information about the current node that sends the first data packet may be the unicast address of the source node. A data packet carries the information about the current node, and may be used by the forwarding node and the destination node for reverse route learning, so that the forwarding node can directly obtain information about a previous-hop node (for example, address information of the previous-hop node). For example, if the information about the current node in the data packet received by the forwarding node identifies the source node, the forwarding node may learn that when the forwarding node needs to send a data packet whose destination node is the "source node", the forwarding node may forward the data packet to the node identified by "the information about the current node".

The QoS requirement of the first data packet identifies a QoS requirement of the service data in the first data packet, and the QoS requirement includes any one of the following: a priority requirement, a reliability requirement, a delay requirement, a priority requirement and a reliability requirement, a reliability requirement and a delay requirement, a priority requirement and a delay requirement, and a priority requirement, a reliability requirement, and a delay requirement.

The forwarding node may forward the service data in the first data packet based on the QoS requirement of the first data packet, to provide a corresponding QoS guarantee. For example, the QoS requirement of the first data packet may identify a prose per packet priority (PPPP), prose per packet reliability (PPPR), a QoS class identifier (QCI), a 5G QoS identifier (5QI), or a differentiated services code point (DSCP).

FIG. 4B shows another format of the first data packet. Based on the format shown in FIG. 4A, the format of the first data packet shown in FIG. 4B further includes at least one of the time information, the sequence number of the first data packet, the maximum quantity of forwarding times of the service data, the source node information of the first data packet, the information about the current node that sends the first data packet, or the QoS requirement of the first data packet. An arrangement order of the fields in the format of the first data packet is not limited in this embodiment of this application, and lengths of the fields in the format of the first data packet shown in FIG. 4B are merely used as an example. Before performing part 200, the source node may further perform part 250, that is, receive indication information sent by the network device, and determine the forwarding node set information of the first data packet based on the indication information. In one embodiment, the network device may send the multicast or broadcast address of the forwarding node set of the first data packet to the source node by using the indication information. After receiving the indication information, the source node may determine that the forwarding node set information of the first data packet is the multicast or broadcast address of the forwarding node set of the first data packet. The indication information may be downlink control information (DCI), radio resource control (RRC) signaling, a system message, a media access control element (MAC CE), or the like, or may be any combination of the foregoing various types of signaling.

In one embodiment of part 210, at least one forwarding node in the at least two forwarding nodes included in the forwarding node set of the first data packet receives the first data packet based on the forwarding node set information of the first data packet and the destination node information. The forwarding node set information of the first data packet identifies the forwarding node set, and the destination node information does not identify the at least one forwarding node in the at least two forwarding nodes included in the forwarding node set. In other words, it may be understood as that the at least one forwarding node in the at least two forwarding nodes is a non-destination node. If the at least one forwarding node in the at least two forwarding nodes determines that the forwarding node set information of the first data packet identifies the forwarding node set and the destination node information does not identify the at least one forwarding node in the at least two forwarding nodes, the at least one forwarding node in the at least two forwarding nodes receives the first data packet at a forwarding protocol layer and a protocol layer below the forwarding protocol layer. The forwarding protocol layer may be a physical (PHY) protocol layer, a media access control (MAC) protocol layer, a radio link control (RLC) protocol layer, a packet data convergence protocol (PDCP) protocol layer, a service data adaptation protocol (SDAP) protocol layer, or another newly added protocol layer. In this case, the at least one forwarding node in the at least two forwarding nodes included in the forwarding node set is a non-destination node. Therefore, the at least one forwarding node in the at least two forwarding nodes does not need to know particular content of the service data (that is, does not need to parse out the service data), and only needs to forward the service data in the first data packet.

Figure 5A:
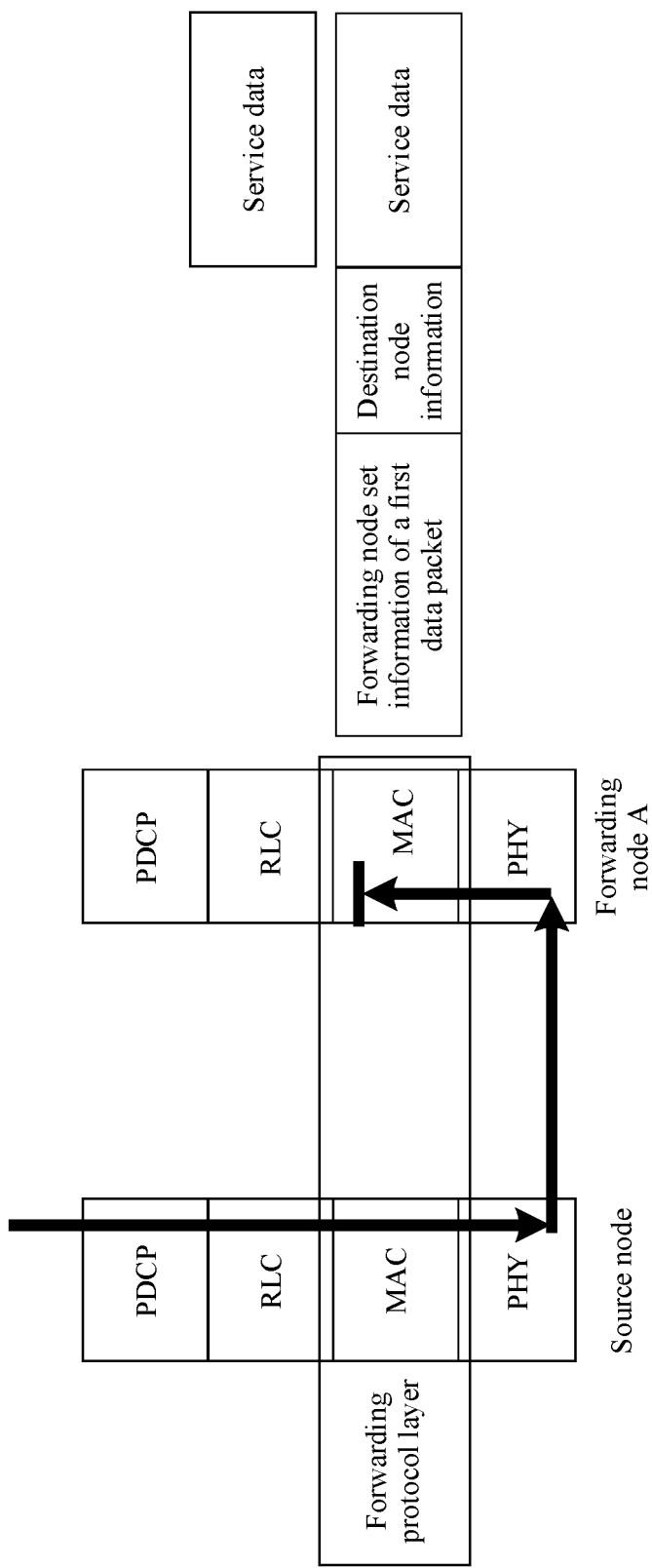
FIG. 5A is a schematic diagram of a data flowing direction at protocol layers according to an embodiment of this application.

FIG. 3A is used as an example. The forwarding node set information of the first data packet included in the first data packet sent by the source node identifies a forwarding node set in FIG. 3A, and the forwarding node set includes a forwarding node A and a forwarding node B. In this case, both the forwarding node A and the forwarding node B may receive the first data packet. The destination node information included in the first data packet identifies a destination node in FIG. 3A, but does not identify the forwarding node set in FIG. 3A (which may also be understood as that the forwarding node A and the forwarding node B in FIG. 3A are not identified). In this case, the forwarding node A and the forwarding node B receive the first data packet at a forwarding protocol layer and a protocol layer below the forwarding protocol layer. FIG. 5A shows an example of a data flowing direction in which the MAC protocol layer is used as the forwarding protocol layer and the forwarding node A is used as the forwarding node in this case. The forwarding node A receives or processes the first data packet only at the forwarding protocol layer (namely, the MAC protocol layer) and a protocol layer (namely, the PHY protocol layer) below the forwarding protocol layer. The service data included in the first data packet is no longer received or processed by a protocol layer (namely, the RLC protocol layer and/or PDCP protocol layer) above the forwarding protocol layer. Herein, the forwarding node A receives the first data packet at the MAC protocol layer and a protocol layer below the MAC protocol layer, and does not need to further parse out the service data in the first data packet, so that a processing procedure is simplified and security protection on the service data at the forwarding node is improved.

In one embodiment of part 210, at least one forwarding node in the at least two forwarding nodes included in the forwarding node set of the first data packet receives the first data packet based on the forwarding node set information of the first data packet and the destination node information. The forwarding node set information of the first data packet identifies the forwarding node set, and the destination node information further identifies the at least one forwarding node in the at least two forwarding nodes included in the forwarding node set. In other words, it may be understood as that the at least one forwarding node in the at least two forwarding nodes included in the forwarding node set is also a destination node. If the at least one forwarding node in the at least two forwarding nodes determines that the forwarding node set information of the first data packet identifies the forwarding node set and the destination node information further identifies the at least one forwarding node in the at least two forwarding nodes, the at least one forwarding node in the at least two forwarding nodes receives the first data packet at a forwarding protocol layer and a protocol layer below the forwarding protocol layer, and receives the service data in the first data packet at a protocol layer above the forwarding protocol layer. The forwarding protocol layer may be a PHY protocol layer, a MAC protocol layer, an RLC protocol layer, a PDCP protocol layer, an SDAP protocol layer, or another newly added protocol layer. In this case, the at least one forwarding node in the at least two forwarding nodes included in the forwarding node set is also a destination node. Therefore, in addition to forwarding the service data in the first data packet, optionally, the at least one forwarding node in the at least two forwarding nodes further needs to know particular content of the service data (that is, needs to parse out the service data).

Figure 5B:
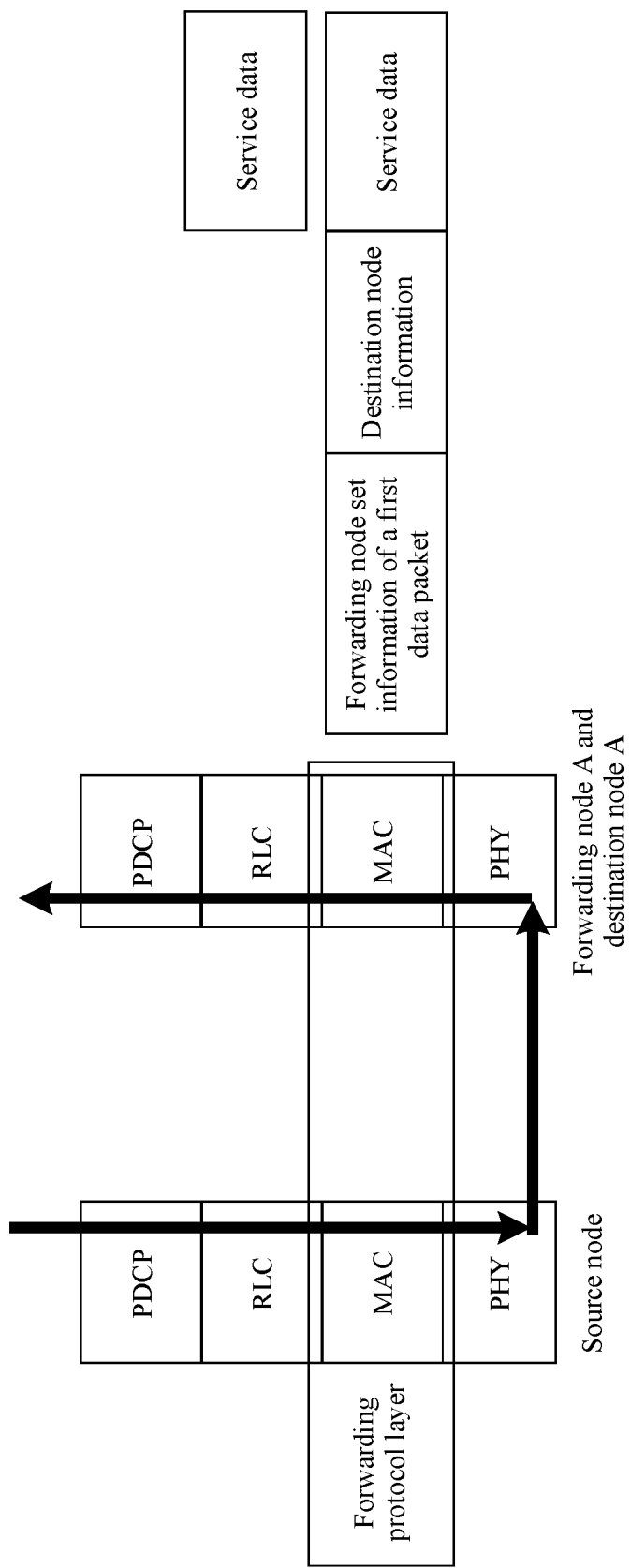
FIG. 5B is a schematic diagram of another data flowing direction at protocol layers according to an embodiment of this application.

FIG. 3B is used as an example. The forwarding node set information of the first data packet included in the first data packet sent by the source node identifies a forwarding node set in FIG. 3B, and the forwarding node set includes a forwarding node A and a forwarding node B. In this case, both the forwarding node A and the forwarding node B may receive the first data packet. The destination node information included in the first data packet identifies a destination node set in FIG. 3B, and the destination node set includes a destination node A and a destination node B. The destination node A and the forwarding node A are a same node. Therefore, it may be understood as that the destination node information further identifies the forwarding node A included in the forwarding node set. In this case, the forwarding node A receives the first data packet at a forwarding protocol layer and a protocol layer below the forwarding protocol layer, and receives the service data in the first data packet at a protocol layer above the forwarding protocol layer. FIG. 5B shows an example of a data flowing direction in which the MAC protocol layer is used as the forwarding protocol layer and the forwarding node A (also the destination node A) is used as the forwarding node in this case. The forwarding node A receives or processes the first data packet at the forwarding protocol layer (namely, the MAC protocol layer) and a protocol layer (namely, the PHY protocol layer) below the forwarding protocol layer, and continues to receive or process the service data in the first data packet at a protocol layer (namely, the RLC protocol layer and/or the PDCP protocol layer) above the forwarding protocol layer. In this case, the forwarding node A (also the destination node A) receives the first data packet at the MAC protocol layer and a protocol layer below the MAC protocol layer, and obtains the service data at a protocol layer (for example, the RLC protocol layer and/or the PDCP protocol layer) above the MAC protocol layer, to successfully parse out and forward the service data when a node is both a forwarding node and a destination node.

It may be understood that receiving the first data packet at the forwarding protocol layer and a protocol layer below the forwarding protocol layer and receiving the service data in the first data packet at a protocol layer above the forwarding protocol layer are related to processing performed on the first data packet at the protocol layers. For example, in FIG. 5B, the MAC protocol layer is used as a forwarding protocol layer. An RLC protocol layer of the source node transmits the service data to a MAC protocol layer of the source node, the MAC protocol layer of the source node includes the forwarding node set information of the first data packet and the destination node information to the service data, then transmits the service data to a PHY protocol layer, and sends the first data packet by using a radio physical resource. The radio physical resource includes at least one of time, frequency, space, or a power resource. A PHY protocol layer of the forwarding node A (also the destination node A) receives the first data packet by using the radio physical resource, and transmits the first data packet to a MAC protocol layer of the forwarding node A. The MAC protocol layer of the forwarding node A removes or hides the forwarding node set information of the first data packet and the destination node information that are included in the first data packet, and then forwards the service data to an RLC protocol layer of the forwarding node A for further processing.

It may be understood that at least one of the forwarding node A and the forwarding node B in the example in FIG. 3A or FIG. 3B receives or processes the first data packet according to the process in FIG. 3A or FIG. 3B. For example, both the forwarding node A and the forwarding node B receive or process the first data packet according to the process shown in FIG. 3A or FIG. 3B.

In part 220, the at least one forwarding node in the at least two forwarding nodes may send the second data packet under conditions.

In one embodiment of part 220, as described in the embodiment of part 200, the first data packet further includes valid time information of the service data. The at least one forwarding node in the at least two forwarding nodes determines, based on the valid time information of the service data, that the service data in the first data packet is valid, and sends the second data packet. In one embodiment, the at least one forwarding node in the at least two forwarding nodes determines, based on the valid time information of the service data, that the service data in the first data packet is invalid, and may skip sending the second data packet or may discard the service data. In one embodiment, it can be ensured that the service data received or forwarded by the forwarding node is valid, thereby preventing the destination node from receiving invalid service data, and preventing an air interface resource waste caused by forwarding the invalid service data.

In one embodiment of part 220, as described in the embodiment of part 200, the first data packet further includes a sequence number of the first data packet. The at least one forwarding node in the at least two forwarding nodes determines, based on the sequence number of the first data packet, that the service data in the first data packet has not been forwarded, and sends the second data packet. In one embodiment, when determining, based on the sequence number of the first data packet, that the service data in the first data packet has been forwarded, the at least one forwarding node in the at least two forwarding nodes may skip sending the second data packet or may discard the service data. In one embodiment, the sequence number of the first data packet may uniquely identify the service data in the first data packet. In one embodiment, the forwarding node can be prevented from repeatedly forwarding same service data, thereby improving forwarding efficiency, and preventing an air interface resource waste caused by repeated forwarding.

In one embodiment of part 220, as described in the embodiment of part 200, the first data packet further includes a sequence number of the first data packet and source node information of the first data packet. The at least one forwarding node in the at least two forwarding nodes determines, based on the sequence number of the first data packet and the source node information of the first data packet, that the service data in the first data packet has not been forwarded, and sends the second data packet. In one embodiment, when determining, based on the sequence number of the first data packet and the source node information of the first data packet, that the service data in the first data packet has been forwarded, the at least one forwarding node in the at least two forwarding nodes may skip sending the second data packet or may discard the service data. In one embodiment, the sequence number of the first data packet and the source node information of the first data packet may uniquely identify the service data in the first data packet. In one embodiment, the forwarding node can be prevented from repeatedly forwarding same service data, thereby improving forwarding efficiency, and preventing an air interface resource waste caused by repeated forwarding.

In one embodiment of part 220, as described in the embodiment of part 200, the first data packet further includes a sequence number of the first data packet and source node information of the first data packet. The at least one forwarding node in the at least two forwarding nodes determines, based on the sequence number of the first data packet, the source node information of the first data packet, and the destination node information included in the first data packet, that the service data in the first data packet has not been forwarded, and sends the second data packet. In one embodiment, when determining, based on the sequence number of the first data packet, the source node information of the first data packet, and the destination node information included in the first data packet, that the service data in the first data packet has been forwarded, the at least one forwarding node in the at least two forwarding nodes may skip sending the second data packet or may discard the service data. In one embodiment, the sequence number of the first data packet, the source node information of the first data packet, and the destination node information of the first data packet may uniquely identify the service data in the first data packet. In one embodiment, the forwarding node can be prevented from repeatedly forwarding same service data, thereby improving forwarding efficiency, and preventing an air interface resource waste caused by repeated forwarding.

In one embodiment of part 220, as described in the embodiment of part 200, the first data packet further includes a maximum quantity of forwarding times of the service data. The at least one forwarding node in the at least two forwarding nodes determines that the maximum quantity of forwarding times of the service data is greater than zero, and sends the second data packet. In one embodiment, when determining that the maximum quantity of forwarding times of the service data is equal to zero, the at least one forwarding node in the at least two forwarding nodes may skip sending the second data packet or may discard the service data. In one embodiment of part 200, the forwarding node may alternatively interpret the maximum quantity of forwarding times of the service data as other pre-definitions, and then determine a quantity of times that the service data in the first data packet is allowed to be forwarded. That is, in this embodiment, the description that the maximum quantity of forwarding times is greater than zero or equal to zero may be replaced with a description that the maximum quantity of forwarding times is greater than N or equal to N. N is an integer, and a value of N may be determined by using the foregoing predefined interpretation method. In one embodiment, an appropriate quantity of forwarding times of the service data can be controlled, thereby preventing an air interface resource waste caused because the service data is forwarded for an excessively large quantity of times.

In one embodiment of part 220, as described in the embodiment of part 200, the first data packet further includes a maximum quantity of forwarding times of the service data. The at least one forwarding node in the at least two forwarding nodes determines that the maximum quantity of forwarding times of the service data is greater than zero, and sends the second data packet. The second data packet includes a maximum quantity of forwarding times of the service data, and the maximum quantity of forwarding times of the service data included in the second data packet satisfies an equation: "the maximum quantity of forwarding times of the service data included in the second data packet=the maximum quantity of forwarding times of the service data included in the first data packet−1". In one embodiment, an appropriate quantity of forwarding times of the service data can be controlled, thereby preventing an air interface resource waste caused because the service data is forwarded for an excessively large quantity of times.

In one embodiment of part 220, as described in the embodiment of part 200, the first data packet further includes sending time information of the second data packet. The at least one forwarding node in the at least two forwarding nodes determines the sending time of the second data packet based on the sending time information of the second data packet. In one embodiment, this may be used to instruct a node to send the second data packet at a predetermined time. For example, for service data insensitive to a delay or service data not with a high delay requirement, the sending time information of the second data packet may be used to instruct the node to send the second data packet when an air interface resource is idle. In this way, utilization of the air interface resource is improved. In one embodiment, this method may be used to coordinate time of collaborative forwarding performed by a plurality of nodes, so that the destination node can receive forwarded service data more accurately, thereby increasing a collaboration gain.

It should be noted that the foregoing several possible embodiments of part 220 may alternatively be combined with each other. For example, as described in the one embodiment of part 200, the first data packet further includes valid time information of the service data and a sequence number of the first data packet. The at least one forwarding node in the at least two forwarding nodes determines, based on the valid time information of the service data, that the service data in the first data packet is valid, and determines, based on the sequence number of the first data packet, that the service data in the first data packet has not been forwarded; and sends the second data packet. Other combinations of the foregoing several possible embodiments of part 220 still fall within the protection scope of this application. Details are not described herein again.

In part 220, the forwarding node set information of the second data packet may further identify a non-destination node set and/or a non-destination node, and the non-destination node set includes at least one non-destination node. In one embodiment, the forwarding node set information of the second data packet identifies the destination node set and the non-destination node set. In node distribution shown in FIG. 6 as an example, if forwarding node set information of a second data packet included in the second data packet sent by a forwarding node A identifies a destination node and a non-destination node in FIG. 6, the second data packet sent by the forwarding node A may also be received by the non-destination node. The non-destination node may further send, to the destination node, a third data packet including the service data in the second data packet. In one embodiment, an amount of the service data received by the destination node and/or signal strength of receiving the service data by the destination node can be further increased, thereby improving data transmission reliability.

Figure 6:
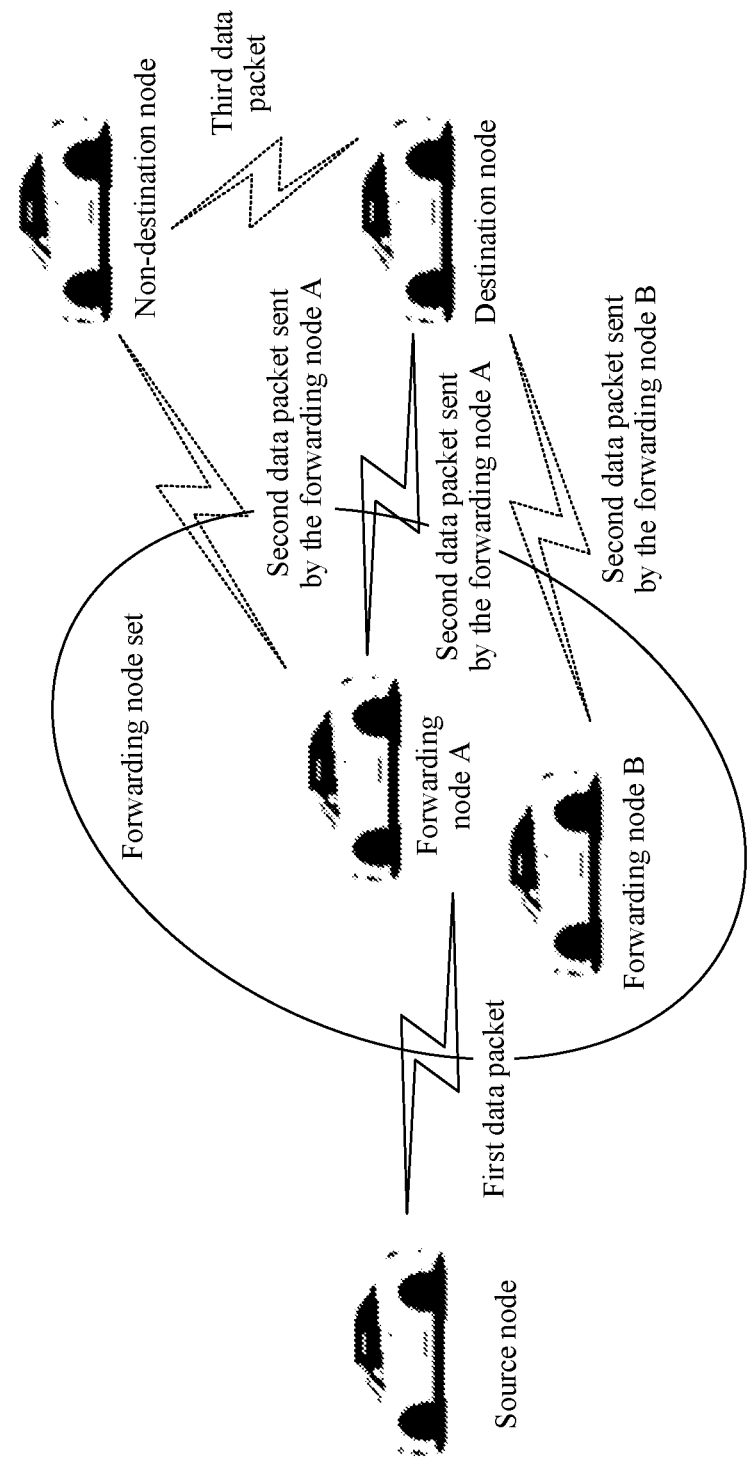
FIG. 6 is a schematic diagram of another scenario to which an embodiment of this application is applicable.

In one embodiment, a forwarding node B shown in FIG. 6 may also send a second data packet. Forwarding node set information of the second data packet included in the second data packet sent by the forwarding node B and the forwarding node set information of the second data packet included in the second data packet sent by the forwarding node A may identify a same node set, or may identify different node sets. In FIG. 6, an example in which different node sets are identified is used. FIG. 6 shows that the forwarding node set information of the second data packet included in the second data packet sent by the forwarding node A identifies a non-destination node and a destination node, and the forwarding node set information of the second data packet included in the second data packet sent by the forwarding node B identifies a destination node.

Figure 7:
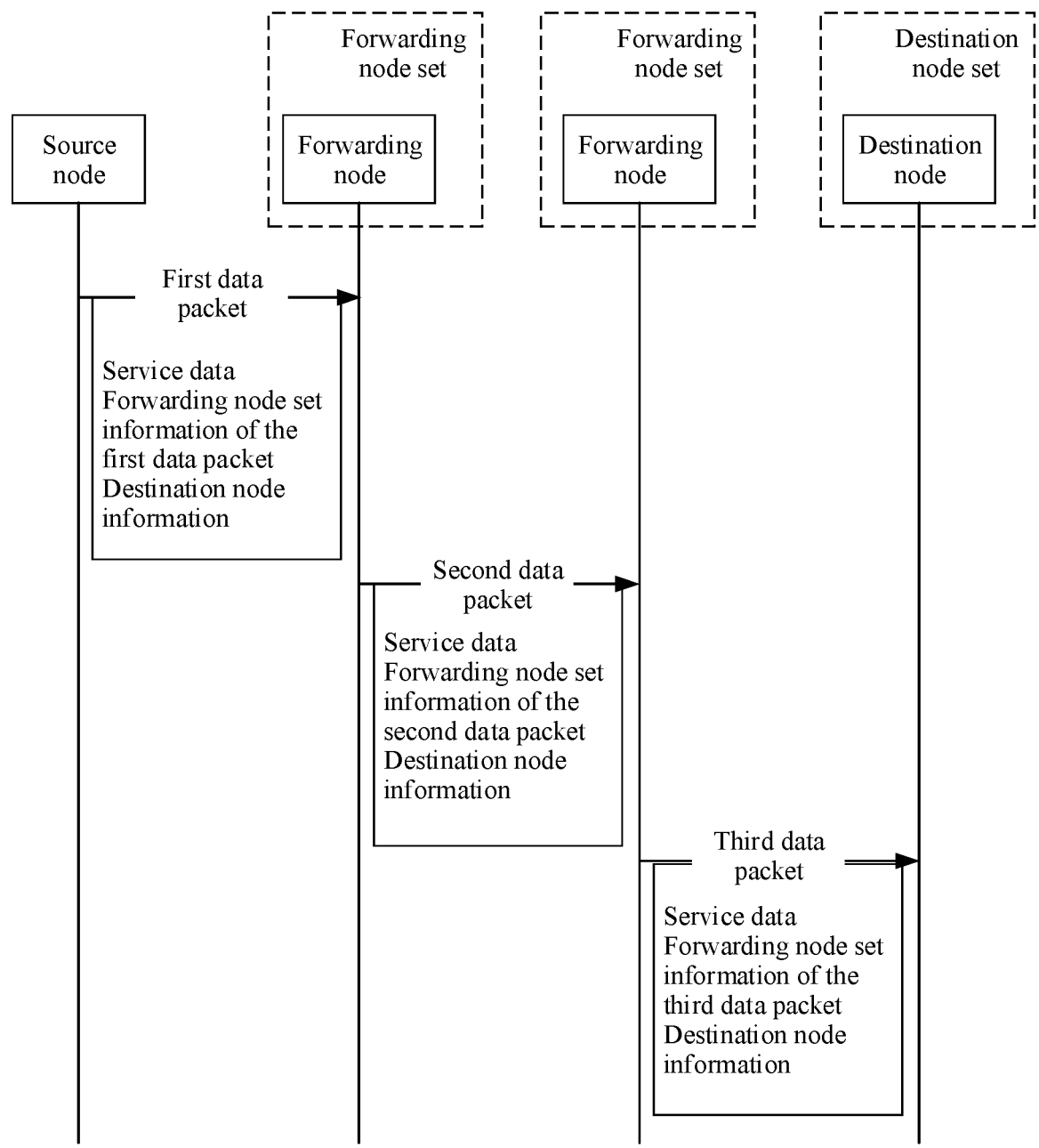
FIG. 7 is a schematic flowchart of another routing method according to an embodiment of this application.

It may be understood that in this embodiment of this application, only a two-hop mode of "source node—forwarding node set—destination node/destination node set" is used as an example to describe an an embodiment of this application. However, a specific quantity of hops in multi-hop is not limited in this application. For example, this application is also applicable to a three-hop mode of "source node—forwarding node set—forwarding node set—destination node/destination node set" or a multi-hop mode involving more forwarding nodes/forwarding node sets. For example, this embodiment of this application may also cover three-hop transmission shown in FIG. 7, where the three-hop transmission involves two forwarding node sets. In one embodiment, in the three-hop transmission or multi-hop transmission involving more forwarding node sets, the forwarding node set information of the second data packet may identify a next-hop forwarding node set (for example, the next-hop forwarding node set may be understood as the non-destination node set), but does not identify the destination node or the destination node set.

In one embodiment of this application, optionally, part 240 in FIG. 2 may be included. That is, the at least one forwarding node in the at least two forwarding nodes stores the service data in the second data packet.

In one embodiment of part 240, the at least one forwarding node in the at least two forwarding nodes stores the service data in the second data packet, before learning that the second data packet is correctly received by at least one destination node in the destination node set and/or the destination node. In this application, a method by using which the at least one forwarding node in the at least two forwarding nodes learns that the second data packet is correctly received by the at least one destination node in the destination node set and/or the destination node is not limited. For example, after correctly receiving the second data packet, the at least one destination node included in the destination node set and/or the destination node may send correct reception feedback information to the at least one forwarding node in the at least two forwarding nodes, so that the at least one forwarding node in the at least two forwarding nodes learns that the second data packet has been correctly received. For another example, after correctly receiving the second data packet, the at least one destination node included in the destination node set and/or the destination node may notify the network device, and the network device sends correct reception feedback information to the at least one forwarding node in the at least two forwarding nodes, so that the at least one forwarding node in the at least two forwarding nodes learns that the second data packet has been correctly received. In one embodiment, the forwarding node can temporarily store the service data before the destination node successfully receives the service data, so that the forwarding node no longer needs to obtain the service data from a previous-hop node when the service data needs to be retransmitted or re-forwarded, thereby increasing a forwarding speed.

In one embodiment of part 240, as described in the embodiment of part 200, the first data packet further includes valid time information of the service data. The at least one forwarding node in the at least two forwarding nodes determines, based on the valid time information of the service data, that the service data in the first data packet is valid, and stores the service data. In one embodiment, the forwarding node no longer needs to obtain the service data from a previous-hop node when the valid service data needs to be retransmitted or re-forwarded, thereby increasing a forwarding speed.

In one embodiment, in another possible embodiment of part 240, as described in the embodiment of part 200, the first data packet further includes sending time information of the second data packet. The at least one forwarding node in the at least two forwarding nodes determines, based on the sending time information of the second data packet, that the sending time of the second data packet has not arrived, and stores the service data in the second data packet. In one embodiment, when obtaining the service data in the second data packet before the sending time of the second data packet, the forwarding node may store the service data, to directly send the service data after the sending time of the second data packet arrives, thereby improving a speed of forwarding the service data.

In one embodiment of part 220, optionally, the second data packet may further include at least one of time information (for example, valid time information of the service data), a sequence number of the second data packet, a maximum quantity of forwarding times of the service data, source node information of the second data packet, information about a current node that sends the second data packet, or a QoS requirement of the second data packet. For details, refer to the descriptions of the time information, the sequence number of the first data packet, the maximum quantity of forwarding times of the service data, the source node information of the first data packet, the current node information of the first data packet, and the QoS requirement of the first data packet in part 200. Details are not described herein again.

It may be understood that, in part 220, the service data included in the second data packet may be the service data included in the first data packet, or may be service data obtained by modifying or adjusting the service data included in the first data packet.

In one embodiment of part 230, the destination node determines that the forwarding node set information of the second data packet identifies the destination node, and determines that the destination node information identifies the destination node. The destination node receives the second data packet at a forwarding protocol layer and a protocol layer below the forwarding protocol layer, and receives the service data in the second data packet at a protocol layer above the forwarding protocol layer. The forwarding protocol layer is a MAC protocol layer, an RLC protocol layer, a PDCP protocol layer, an SDAP protocol layer, or a newly added protocol layer. As to how the destination node receives the second data packet at the forwarding protocol layer and the protocol layer below the forwarding protocol layer, and receives the service data in the second data packet at the protocol layer above the forwarding protocol layer, refer to the descriptions of receiving the first data packet in FIG. 5B in this application. Details are not described herein again.

In one embodiment of part 230, the at least one destination node in the destination node set determines that the forwarding node set information of the second data packet identifies the destination node set, and determines that the destination node information identifies the destination node set. The at least one destination node in the destination node set receives the second data packet at a forwarding protocol layer and a protocol layer below the forwarding protocol layer, and receives the service data in the second data packet at a protocol layer above the forwarding protocol layer. The forwarding protocol layer is a MAC protocol layer, an RLC protocol layer, a PDCP protocol layer, an SDAP protocol layer, or a newly added protocol layer. As to how the at least one destination node receives the second data packet at the forwarding protocol layer and the protocol layer below the forwarding protocol layer, and receives the service data in the second data packet at the protocol layer above the forwarding protocol layer, refer to the descriptions of receiving the first data packet in FIG. 5B in this application. Details are not described herein again.

It may be understood that the newly added protocol layer in this application may be one protocol layer, or may be a plurality of protocol layers. The newly added protocol layer may be between the PHY protocol layer and the MAC protocol layer, between the MAC protocol layer and the RLC protocol layer, between the RLC protocol layer and the PDCP protocol layer, between the PDCP protocol layer and the SDAP protocol layer, or above the SDAP protocol layer.

In part 230, the at least one destination node in the destination node set and/or the destination node may receive the second data packet under conditions.

In one embodiment of part 230, as described in the embodiment of part 220, the second data packet further includes valid time information of the service data. The at least one destination node in the destination node set and/or the destination node determines, based on the valid time information of the service data, that the service data in the second data packet is valid, and receives the second data packet. In one embodiment, when determining, based on the valid time information of the service data, that the service data in the second data packet is invalid, the at least one destination node in the destination node set and/or the destination node may skip receiving the second data packet or may discard the second data packet after receiving the second data packet. In one embodiment, it can be ensured that the service data received by the destination node is valid, thereby preventing the destination node from receiving invalid service data, and preventing an air interface resource waste caused by receiving the invalid service data.

In one embodiment of part 230, as described in the embodiment of part 220, the second data packet further includes a sequence number of the second data packet. The at least one destination node in the destination node set and/or the destination node determines, based on the sequence number of the second data packet, that the service data in the second data packet has not been received, and receives the second data packet. In one embodiment, when determining, based on the sequence number of the second data packet, that the service data in the second data packet has been received, the at least one destination node in the destination node set and/or the destination node may not receive the second data packet, or may discard the second data packet after receiving the second data packet. In one embodiment, the sequence number of the second data packet may uniquely identify the service data in the second data packet. In one embodiment, the destination node can be prevented from repeatedly receiving same service data, thereby improving receiving efficiency, and preventing an air interface resource waste caused by repeated receiving.

In one embodiment of part 230, as described in the embodiment of part 220, the second data packet further includes a sequence number of the second data packet and source node information of the second data packet. The at least one destination node in the destination node set and/or the destination node determines, based on the sequence number of the second data packet and the source node information of the second data packet, that the service data in the second data packet has not been received, and receives the second data packet. In one embodiment, when determining, based on the sequence number of the second data packet and the source node information of the second data packet, that the service data in the second data packet has been received, the at least one destination node in the destination node set and/or the destination node may not receive the second data packet, or may discard the second data packet after receiving the second data packet. In one embodiment, the sequence number of the second data packet and the source node information of the second data packet may uniquely identify the service data in the second data packet. In one embodiment, the destination node can be prevented from repeatedly receiving same service data, thereby improving forwarding efficiency, and preventing an air interface resource waste caused by repeated receiving.

In one embodiment of part 230, as described in the embodiment of part 220, the second data packet further includes a sequence number of the second data packet and source node information of the second data packet. The at least one destination node in the destination node set and/or the destination node determines, based on the sequence number of the second data packet, the source node information of the second data packet, and the destination node information included in the second data packet, that the service data in the second data packet has not been received, and receives the second data packet. In one embodiment, when determining, based on the sequence number of the second data packet, the source node information of the second data packet, and the destination node information included in the second data packet, that the service data in the second data packet has been received, the at least one destination node in the destination node set and/or the destination node may not receive the second data packet, or may discard the second data packet after receiving the second data packet. In one embodiment, the sequence number of the second data packet, the source node information of the second data packet, and the destination node information may uniquely identify the service data in the second data packet. In one embodiment, the destination node can be prevented from repeatedly receiving same service data, thereby improving forwarding efficiency, and preventing an air interface resource waste caused by repeated receiving.

It may be understood that, in some scenarios, repeatedly receiving same service data may improve receiving reliability of the service data. Therefore, if the receiving reliability of the service data is expected to be improved by repeatedly receiving the service data, the network device may configure a function of performing repeated detection or receiving for the at least one destination node in the destination node set and/or the destination node by using an indication (for example, repeated receiving indication information carried in a data packet, or a notification).

The foregoing several possible embodiments of part 230 may alternatively be combined with each other. For example, as described in the embodiment of part 220, the second data packet further includes valid time information of the service data and a sequence number of the second data packet. The at least one destination node in the destination node set and/or the destination node determines, based on the valid time information of the service data, that the service data in the second data packet is valid, and determines, based on the sequence number of the second data packet, that the service data in the second data packet has not been received; and receives the second data packet. Other combinations of the foregoing several possible embodiments of part 230 still fall within the protection scope of this application. Details are not described herein again.

According to the routing method and the apparatus provided in the embodiments of this application, a multicast routing method in which routing information does not need to be maintained is introduced into a cellular wireless communications network, so that high-reliable multi-hop transmission in the cellular wireless communications network is implemented, thereby resolving a problem that a range of direct communication between terminals by using a single-hop link is poor.

It may be understood that the method implemented by the communications device in the foregoing method embodiment may alternatively be implemented by a component (for example, an integrated circuit or a chip) that can be used in the communications device.

Corresponding to the wireless communication method provided in the foregoing method embodiment, an embodiment of this application further provides a corresponding communications apparatus (sometimes also referred to as a communications device). The communications apparatus includes a corresponding module configured to perform each part in the foregoing embodiment. The module may be software, hardware, or a combination of software and hardware.

Figure 8:
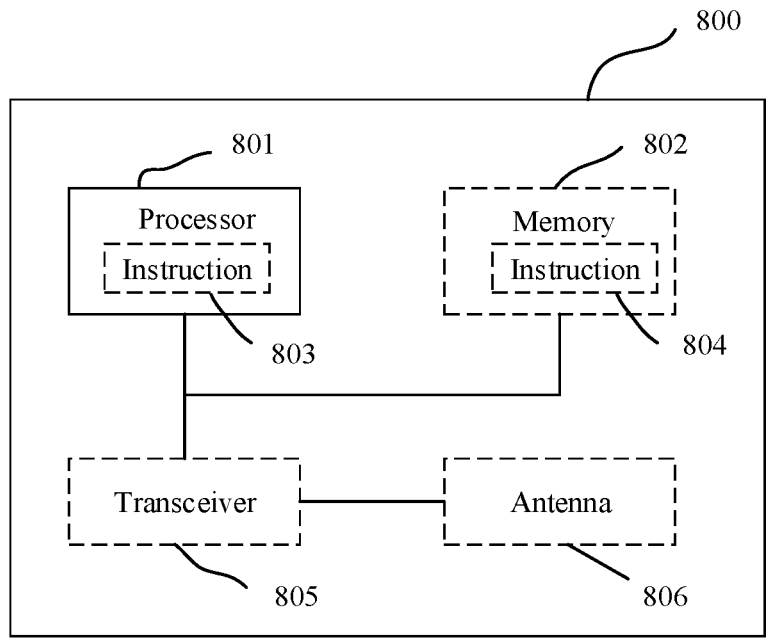
FIG. 8 is a schematic structural diagram of a communications apparatus according to an embodiment of this application.

FIG. 8 is a schematic structural diagram of a communications apparatus. The communications apparatus 800 may be the network device 14 in FIG. 1, or may be the terminal 11, 12, or 13 in FIG. 1. The communications apparatus may be configured to implement the method that corresponds to the communications device and that is described in the foregoing method embodiment. For details, refer to the descriptions in the foregoing method embodiment.

The communications apparatus 800 may include one or more processors 801. The processor 801 may also be referred to as a processing unit, and may implement a control function. The processor 801 may be a general purpose processor, a special-purpose processor, or the like. For example, the processor may be a baseband processor or a central processing unit. The baseband processor may be configured to process a communication protocol and communication data. The central processing unit may be configured to control the communications apparatus (for example, a base station, a baseband chip, a distributed unit (DU), or a centralized unit (CU)), execute a software program, and process data of the software program.

In one embodiment, the processor 801 may alternatively store an instruction 803, and the instruction may be run by the processor, so that the communications apparatus 800 performs the method that corresponds to the communications device and that is described in the foregoing method embodiment.

In one embodiment, the communications apparatus 800 may include a circuit, and the circuit may implement the function of sending, receiving, or communication in the foregoing method embodiment.

In one embodiment, the communications apparatus 800 may include one or more memories 802. The memory 802 may store an instruction 804, and the instruction may be run on the processor, so that the communications apparatus 800 performs the method described in the foregoing method embodiment. In one embodiment, the memory may further store data. In one embodiment, the processor may further store an instruction and/or data. The processor and the memory may be disposed separately, or may be integrated together.

In one embodiment, the communications apparatus 800 may further include a transceiver 805 and/or an antenna 806. The processor 801 may be referred to as a processing unit, and controls the communications apparatus (a terminal or a network device). The transceiver 805 may be referred to as a transceiver unit, a transceiver machine, a transceiver circuit, a transceiver, or the like, and is configured to implement receiving and sending functions of the communications apparatus.

In one embodiment, a communications apparatus 800 (for example, an integrated circuit, a wireless device, a circuit module, a network device, or a terminal) may include a processor 801 and a transceiver 805. The transceiver 805 receives a first data packet from a source node, where the first data packet includes service data, forwarding node set information of the first data packet, and destination node information; and a forwarding node set of the first data packet includes at least two forwarding nodes, and the destination node information identifies a destination node set and/or a destination node. The processor 801 processes the first data packet. The transceiver 805 sends a second data packet, where the second data packet includes the service data, forwarding node set information of the second data packet, and the destination node information.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal as an example. However, a scope of the communications apparatus described in this application is not limited to the example, and the structure of the communications apparatus may not be limited by FIG. 8. The communications apparatus may be an independent device or may be a part of a relatively large device. For example, the device may be:

(1) an independent integrated circuit (IC), a chip, or a chip system or subsystem;

(2) a set including one or more ICs, where optionally, the IC set may further include a storage component configured to store data and/or an instruction;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; and (6) another device or the like.

Figure 9:
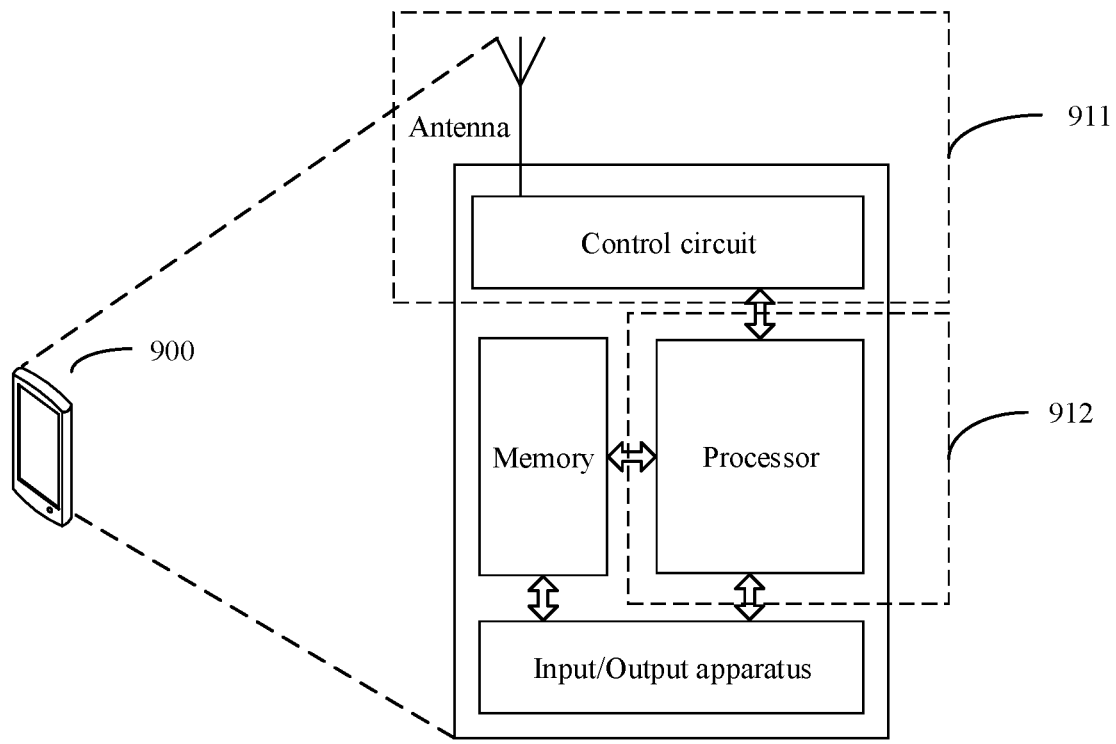
FIG. 9 is a schematic structural diagram of a terminal according to an embodiment of this application.

FIG. 9 is a schematic structural diagram of a terminal. The terminal may be applicable to the system shown in FIG. 1. For ease of description, FIG. 9 shows only main components of the terminal. As shown in FIG. 9, the terminal 900 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display screen, or a keyboard is mainly configured to receive data input by a user and output data to the user.

After user equipment is turned on, the processor may read a software program stored in a storage unit, parse and execute an instruction of the software program, and process data of the software program. When data needs to be sent wirelessly, after performing baseband processing on the to-be-sent data, the processor outputs a baseband signal to a radio frequency circuit. After processing the baseband signal, the radio frequency circuit obtains a radio frequency signal and sends the radio frequency signal to the outside through an antenna in a form of an electromagnetic wave. When data is sent to the user equipment, the radio frequency circuit receives a radio frequency signal by using the antenna, further converts the radio frequency signal into a baseband signal, and outputs the baseband signal to the processor, and the processor converts the baseband signal into data and processes the data.

A person skilled in the art may understand that for ease of description, FIG. 9 shows only one memory and only one processor. An actual terminal may include a plurality of processors and a plurality of memories. The memory may also be referred to as a storage medium, a storage device, or the like. This is not limited in the embodiments of the present application.

In one embodiment, the processor may include a baseband processor and a central processing unit. The baseband processor is mainly configured to process a communication protocol and communication data, and the central processing unit is mainly configured to: control the entire terminal, execute a software program, and process data of the software program. Functions of the baseband processor and the central processing unit are integrated into the processor in FIG. 9. A person skilled in the art may understand that the baseband processor and the central processing unit each may be an independent processor, and are interconnected by using technologies such as a bus. A person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In an example, an antenna having receiving and sending functions and a control circuit may be considered as a transceiver unit 911 of the terminal 900, and a processor that has a processing function may be considered as a processing unit 912 of the terminal 900. As shown in FIG. 9, the terminal 900 includes the transceiver unit 911 and the processing unit 912. The transceiver unit may also be referred to as a transceiver, a transceiver machine, a transceiver apparatus, or the like. In one embodiment, a component that is in the transceiver unit 911 and that is configured to implement a receiving function may be considered as a receiving unit, and a component that is in the transceiver unit 911 and that is configured to implement a sending function may be considered as a sending unit. In other words, the transceiver unit 911 includes the receiving unit and the sending unit. For example, the receiving unit may also be referred to as a receiver machine, a receiver, a receiving circuit, or the like, and the sending unit may be referred to as a transmitter machine, a transmitter, a transmitting circuit, or the like. In one embodiment, the receiving unit and the sending unit may be integrated into one unit, or may be a plurality of units independent of each other. The receiving unit and the sending unit may be located at one geographical location, or may be scattered at a plurality of geographical locations.

Figure 10:
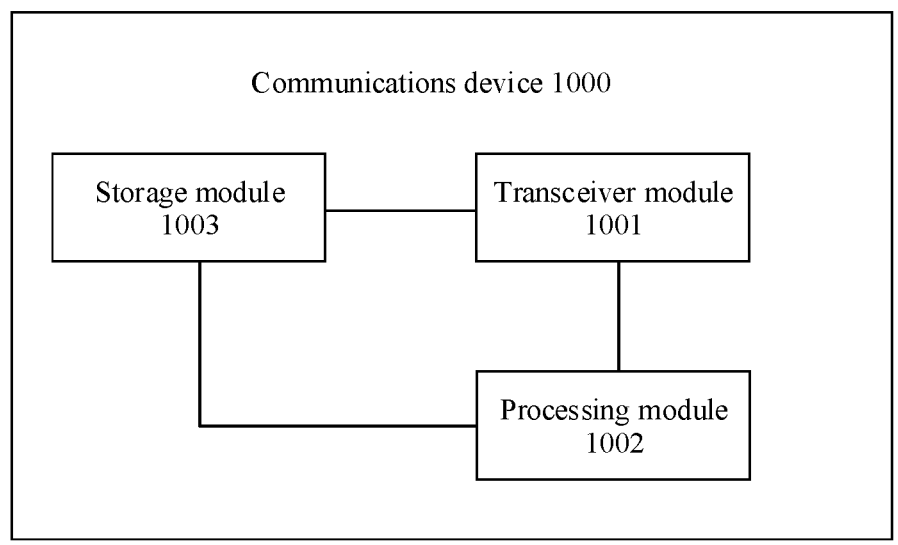
FIG. 10 is a schematic diagram of a communications device according to an embodiment of this application.

As shown in FIG. 10, another embodiment of this application provides a communications apparatus (a communications device) 1000. The communications apparatus may be a terminal, or may be a component (for example, an integrated circuit or a chip) of a terminal. The communications apparatus may alternatively be a network device, or may be a component (for example, an integrated circuit or a chip) of a network device. Alternatively, the communications apparatus may be another communications module, configured to implement an operation corresponding to the communications device in the method embodiment of this application. The communications apparatus 1000 may include a processing module 1002. In one embodiment, the communications apparatus 1000 may further include a transceiver module 1001 and a storage module 1003.

In one embodiment, one or more modules in FIG. 10 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be separately disposed, or may be integrated together.

The communications apparatus has a function of implementing the forwarding node described in the embodiments of this application. For example, the communications apparatus includes modules, units, or means (means) corresponding to the operations performed by the forwarding node described in the embodiments of this application, and the functions, units, or means (means) may be implemented by software, may be implemented by hardware, or may be implemented by hardware executing corresponding software. For details, refer to corresponding descriptions in the foregoing corresponding method embodiment.

Alternatively, the communications apparatus has a function of implementing the source node described in the embodiments of this application. For example, the communications apparatus includes modules, units, or means corresponding to the operations performed by the source node described in the embodiments of this application, and the functions, units, or means may be implemented by software, may be implemented by hardware, or may be implemented by hardware executing corresponding software. For details, refer to corresponding descriptions in the foregoing corresponding method embodiment.

Alternatively, the communications apparatus has a function of implementing the network device described in the embodiments of this application. For example, the communications apparatus includes modules, units, or means corresponding to the operations performed by the network device described in the embodiments of this application, and the functions, units, or means may be implemented by software, may be implemented by hardware, or may be implemented by hardware executing corresponding software. For details, refer to corresponding descriptions in the foregoing corresponding method embodiment.

In one embodiment, the modules in the communications apparatus 1000 in this embodiment of this application may be configured to perform the method described in the embodiments of this application.

In one embodiment, the transceiver module 1001 receives a first data packet from a source node, where the first data packet includes service data, forwarding node set information of the first data packet, and destination node information; and a forwarding node set of the first data packet includes at least two forwarding nodes, and the destination node information identifies a destination node set and/or a destination node. The transceiver module 1001 sends a second data packet, where the second data packet includes the service data, forwarding node set information of the second data packet, and the destination node information.

In one embodiment, when the destination node information does not identify the at least one forwarding node in the at least two forwarding nodes, the processing module 1002 processes the first data packet at a forwarding protocol layer and a protocol layer below the forwarding protocol layer, where the forwarding protocol layer is any one of the following: a media access control MAC protocol layer, a radio link control RLC protocol layer, a packet data convergence protocol PDCP protocol layer, and a service data adaptation protocol SDAP protocol layer.

In one embodiment, when the destination node information identifies the at least one forwarding node in the at least two forwarding nodes, the processing module 1002 processes the first data packet at a forwarding protocol layer and a protocol layer below the forwarding protocol layer, and the processing module 1002 processes the service data at a protocol layer above the forwarding protocol layer, where the forwarding protocol layer is any one of the following: a media access control MAC protocol layer, a radio link control RLC protocol layer, a packet data convergence protocol PDCP protocol layer, and a service data adaptation protocol SDAP protocol layer.

In one embodiment, the first data packet includes any one or more of time information, a sequence number of the first data packet, a maximum quantity of forwarding times of the service data, or source node information of the first data packet.

In one embodiment, the time information includes valid time information of the service data and/or sending time information of the second data packet.

In one embodiment, the sequence number of the first data packet is used to identify or index the first data packet.

In one embodiment, the maximum quantity of forwarding times of the service data is used to indicate a maximum quantity of times that the service data is allowed to be forwarded.

In one embodiment, the source node information of the first data packet is used to identify the source node.

In one embodiment, the processing module 1002 controls, based on any one or more of the following: the time information, the sequence number of the first data packet, the maximum quantity of forwarding times of the service data, or the source node information of the first data packet, the transceiver module 1001 to send the second data packet.

In one embodiment, the processing module 1002 determines, based on the valid time information of the service data, that the service data is valid; and controls the transceiver module 1001 to send the second data packet.

In one embodiment, the processing module 1002 determines, based on the sequence number of the first data packet, that the service data has not been forwarded by the at least one forwarding node in the at least two forwarding nodes; and controls the transceiver module 1001 to send the second data packet.

In one embodiment, the processing module 1002 determines that the maximum quantity of forwarding times of the service data is greater than zero, and controls the transceiver module 1001 to send the second data packet.

In one embodiment, the processing module 1002 determines, based on the valid time information of the service data, that the service data is valid, and determines, based on the sequence number of the first data packet, that the service data has not been forwarded by the at least one forwarding node in the at least two forwarding nodes; and controls the transceiver module 1001 to send the second data packet.

In one embodiment, the processing module 1002 determines, based on the valid time information of the service data, that the service data is valid, and the maximum quantity of forwarding times of the service data is greater than zero; and controls the transceiver module 1001 to send the second data packet.

In one embodiment, the processing module 1002 determines, based on the sequence number of the first data packet, that the service data has not been forwarded by the at least one forwarding node in the at least two forwarding nodes, and the maximum quantity of forwarding times of the service data is greater than zero; and controls the transceiver module 1001 to send the second data packet.

In one embodiment, the processing module 1002 determines, based on the valid time information of the service data, that the service data is valid, and determines, based on the sequence number of the first data packet, that the service data has not been forwarded by the at least one forwarding node in the at least two forwarding nodes, and the maximum quantity of forwarding times of the service data is greater than zero; and controls the transceiver module 1001 to send the second data packet.

In one embodiment, the second data packet includes a maximum quantity of forwarding times of the service data, and the processing module 1002 determines, according to the following equation, the maximum quantity of forwarding times of the service data included in the second data packet: the maximum quantity of forwarding times of the service data included in the second data packet=the maximum quantity of forwarding times of the service data included in the first data packet−1.

In one embodiment, the processing module 1002 determines a sending time of the second data packet based on the sending time information of the second data packet included in the first data packet.

In one embodiment, the second data packet includes a maximum quantity of forwarding times of the service data, and the processing module 1002 determines, according to the following equation, the maximum quantity of forwarding times of the service data included in the second data packet: the maximum quantity of forwarding times of the service data included in the second data packet=the maximum quantity of forwarding times of the service data included in the first data packet−1; and the processing module 1002 determines a sending time of the second data packet based on the sending time information of the second data packet included in the first data packet.

In one embodiment, the processing module 1002 controls the memory module 1003 to store the service data before learning that the second data packet is correctly received by at least one destination node in the destination node set and/or the destination node.

In one embodiment, the processing module 1002 determines, based on the valid time information of the service data included in the first data packet, that the service data is valid; and controls the memory module 1003 to store the service data.

In one embodiment, the processing module 1002 determines, based on the sending time information of the second data packet included in the first data packet, that the sending time of the second data packet has not arrived, and controls the memory module 1003 to store the service data.

A person skilled in the art may further understand that various illustrative logical blocks and operations listed in the embodiments of this application may be implemented by using electronic hardware, a computer program, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communications apparatus (for example, a base station, a terminal, a network entity, or a chip) may be implemented in one or more general purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general purpose processor may be a microprocessor. In one embodiment, the general purpose processor may also be any traditional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. The at least two means two or more. "At least one", "any one", or a similar expression thereof means any combination of these items, including any combination of a single item (quantity) or a plurality of items (quantity). For example, at least one (piece, or type) of a, b, or c may indicate: a, b, c, a-b, a-c, b-c, or a-b-c, where a, b, and c may be singular or plural.

Operations of the method or algorithms described in the embodiments of this application may be directly embedded in hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Alternatively, the memory may further be integrated into a processor. The processor and the memory may be disposed in an ASIC, and the ASIC may be disposed in a terminal. In one embodiment, the processor and the memory may alternatively be disposed in different components of the terminal.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. The foregoing combination should also be included in the protection scope of the computer-readable medium.

For same or similar parts in the embodiments of this specification, refer to each other. The foregoing embodiments of this application are not intended to limit the protection scope of this application.

What is claimed is:

1. A wireless communication method comprising:
receiving, by at least two forwarding nodes, a first data packet from a source node, wherein the first data packet comprises service data, forwarding node set information of the first data packet, and destination node information, wherein a forwarding node set of the first data packet comprises the at least two forwarding nodes, wherein the destination node information identifies at least one of a destination node set or a destination node, and wherein the receiving, by the at least two forwarding nodes, the first data packet from the source node comprises:
when the destination node information does not identify at least one forwarding node in the at least two forwarding nodes, receiving the first data packet at a forwarding protocol layer and a protocol layer below the forwarding protocol layer; or
when the destination node information identifies the at least one forwarding node in the at least two forwarding nodes, receiving the first data packet at the forwarding protocol layer and the protocol layer below the forwarding protocol layer, and obtaining the service data at a protocol layer above the forwarding protocol layer;
wherein the forwarding protocol layer is any one of the following: a media access control (MAC) protocol layer, a radio link control (RLC) protocol layer, a packet data convergence protocol (PDCP) protocol layer, or a service data adaptation protocol (SDAP) protocol layer; and
sending, by the at least one forwarding node in the at least two forwarding nodes, a second data packet, wherein the second data packet comprises the service data, forwarding node set information of the second data packet, and the destination node information.

2. The method according to claim 1, wherein,
the first data packet comprises any one or more of time information, a sequence number of the first data packet, a maximum quantity of forwarding times of the service data, or source node information of the first data packet;
the time information comprises at least one of valid time information of the service data or sending time information of the second data packet;
the sequence number of the first data packet is used to identify or index the first data packet;
the maximum quantity of forwarding times of the service data is used to indicate a maximum quantity of times that the service data is allowed to be forwarded;
the source node information of the first data packet is used to identify the source node; and
the sending, by the at least one forwarding node in the at least two forwarding nodes, a second data packet comprises:

sending, by the at least one forwarding node in the at least two forwarding nodes, the second data packet based on any one or more of the following: the time information, the sequence number of the first data packet, the maximum quantity of forwarding times of the service data, or the source node information of the first data packet.

3. The method according to claim 2, wherein the sending, by the at least one forwarding node in the at least two forwarding nodes, the second data packet based on any one or more of the following: the time information, the sequence number of the first data packet, the maximum quantity of forwarding times of the service data, or the source node information of the first data packet comprises:
sending, by the at least one forwarding node in the at least two forwarding nodes, the second data packet when any one of the following operations is met:
determining, based on the valid time information of the service data, that the service data is valid;
determining, based on the sequence number of the first data packet, that the service data has not been forwarded by the at least one forwarding node in the at least two forwarding nodes;
the maximum quantity of forwarding times of the service data is greater than zero;
determining, based on the valid time information of the service data, that the service data is valid, and determining, based on the sequence number of the first data packet, that the service data has not been forwarded by the at least one forwarding node in the at least two forwarding nodes;
determining, based on the valid time information of the service data, that the service data determining, based on the valid time information of the service data, that the service data is valid, and the maximum quantity of forwarding times of the service data is greater than zero;
determining, based on the sequence number of the first data packet, that the service data has not been forwarded by the at least one forwarding node in the at least two forwarding nodes, and the maximum quantity of forwarding times of the service data is greater than zero; or
determining, based on the valid time information of the service data, that the service data is valid, and determining, based on the sequence number of the first data packet, that the service data has not been forwarded by the at least one forwarding node in the at least two forwarding nodes, and the maximum quantity of forwarding times of the service data is greater than zero.

4. The method according to claim 2, wherein,
the second data packet meets any one of the following:
the second data packet comprises a maximum quantity of forwarding times of the service data, and the maximum quantity of forwarding times of the service data comprised in the second data packet satisfies an equation: the maximum quantity of forwarding times of the service data comprised in the second data packet=the maximum quantity of forwarding times of the service data comprised in the first data packet−1;
a sending time of the second data packet is determined by the at least one forwarding node in the at least two forwarding nodes based on the sending time information of the second data packet comprised in the first data packet; or
the second data packet comprises a maximum quantity of forwarding times of the service data, and the maximum quantity of forwarding times of the service data comprised in the second data packet satisfies an equation: the maximum quantity of forwarding times of the service data comprised in the second data packet=the maximum quantity of forwarding times of the service data comprised in the first data packet−1; and the sending time of the second data packet is determined by the at least one forwarding node in the at least two forwarding nodes based on the sending time information of the second data packet comprised in the first data packet.

5. The method according to claim 1, wherein the method further comprises: storing, by the at least one forwarding node in the at least two forwarding nodes, the service data before learning that the second data packet is correctly received by at least one destination node in at least one of the destination node set or the destination node.

6. The method according to claim 2, wherein the method further comprises: determining, by the at least one forwarding node in the at least two forwarding nodes based on the valid time information of the service data comprised in the first data packet, that the service data is valid, and storing, by the at least one forwarding node in the at least two forwarding nodes, the service data; or
when the at least one forwarding node in the at least two forwarding nodes determines, based on the sending time information of the second data packet comprised in the first data packet, that a sending time of the second data packet has not arrived, storing, by the at least one forwarding node in the at least two forwarding nodes, the service data.

7. The method according to claim 1, wherein,
the first data packet comprises information about at least one of a current node that sends the first data packet or a quality of service (QOS) requirement of the first data packet; and
the information about the current node that sends the first data packet identifies the source node; and the quality of service (QOS) requirement of the first data packet identifies at least one of a priority requirement or a reliability requirement.

8. The method according to claim 1, wherein,
the second data packet comprises information about at least one of a current node that sends the second data packet or a quality of service (QOS) requirement of the second data packet; and
the information about the current node that sends the second data packet identifies a forwarding node in the at least two forwarding nodes, and the forwarding node sends the second data packet, and the quality of service (QOS) requirement of the second data packet comprises at least one of a priority requirement or a reliability requirement.

9. An apparatus comprising:
a processor; and
a non-transitory memory coupled to the processor to store instructions, which when executed by the processor, cause the apparatus to perform operations, the operations comprising:
receiving, by at least two forwarding nodes, a first data packet from a source node, wherein the first data packet comprises service data, forwarding node set information of the first data packet, and destination node information, wherein a forwarding node set of the first data packet comprises the at least two forwarding nodes, wherein the destination node information identifies at least one of a destination node set or a destination node, and wherein the receiving, by the at least two forwarding nodes, the first data packet from the source node comprises:
when the destination node information does not identify at least one forwarding node in the at least two forwarding nodes, receiving the first data packet at a forwarding protocol layer and a protocol layer below the forwarding protocol layer; or
when the destination node information identifies the at least one forwarding node in the at least two forwarding nodes, receiving the first data packet at the forwarding protocol layer and the protocol layer below the forwarding protocol layer, and obtaining the service data at a protocol layer above the forwarding protocol layer;
wherein the forwarding protocol layer is any one of the following: a media access control (MAC) protocol layer, a radio link control (RLC) protocol layer, a packet data convergence protocol (PDCP) protocol layer, or a service data adaptation protocol (SDAP) protocol layer; and
sending, by the at least one forwarding node in the at least two forwarding nodes, a second data packet, wherein the second data packet comprises the service data, forwarding node set information of the second data packet, and the destination node information.

10. The apparatus according to claim 9, wherein,
the first data packet comprises any one or more of time information, a sequence number of the first data packet, a maximum quantity of forwarding times of the service data, or source node information of the first data packet;
the time information comprises at least one of valid time information of the service data or sending time information of the second data packet;
the sequence number of the first data packet is used to identify or index the first data packet;
the maximum quantity of forwarding times of the service data is used to indicate a maximum quantity of times that the service data is allowed to be forwarded;
the source node information of the first data packet is used to identify the source node; and
the sending, by the at least one forwarding node in the at least two forwarding nodes, a second data packet comprises:
sending, by the at least one forwarding node in the at least two forwarding nodes, the second data packet based on any one or more of the following: the time information, the sequence number of the first data packet, the maximum quantity of forwarding times of the service data, or the source node information of the first data packet.

11. The apparatus according to claim 9, wherein the operations further comprise:
storing, by the at least one forwarding node in the at least two forwarding nodes, the service data before learning that the second data packet is correctly received by at least one destination node in at least one of the destination node set or the destination node.

12. A non-transitory computer readable medium storing a program that is executable by a computing device on one of at least two forwarding nodes to cause the at least two forwarding nodes to perform operations comprising:
receiving a first data packet from a source node, wherein the first data packet comprises service data, forwarding node set information of the first data packet, and destination node information, wherein a forwarding node set of the first data packet comprises the at least two forwarding nodes, wherein the destination node information identifies at least one of a destination node set or a destination node, and wherein the receiving, by the at least two forwarding nodes, the first data packet from the source node comprises:
when the destination node information does not identify at least one forwarding node in the at least two forwarding nodes, receiving the first data packet at a forwarding protocol layer and a protocol layer below the forwarding protocol layer; or
when the destination node information identifies the at least one forwarding node in the at least two forwarding nodes, receiving the first data packet at the forwarding protocol layer and the protocol layer below the forwarding protocol layer, and obtaining the service data at a protocol layer above the forwarding protocol layer;
wherein the forwarding protocol layer is any one of the following: a media access control (MAC) protocol layer, a radio link control (RLC) protocol layer, a packet data convergence protocol (PDCP) protocol layer, or a service data adaptation protocol (SDAP) protocol layer; and
sending, a second data packet, wherein the second data packet comprises the service data, forwarding node set information of the second data packet, and the destination node information.

13. The non-transitory computer readable medium according to claim 12, wherein
the first data packet comprises any one or more of time information, a sequence number of the first data packet, a maximum quantity of forwarding times of the service data, or source node information of the first data packet;
the time information comprises at least one of valid time information of the service data or sending time information of the second data packet;
the sequence number of the first data packet is used to identify or index the first data packet;
the maximum quantity of forwarding times of the service data is used to indicate a maximum quantity of times that the service data is allowed to be forwarded;
the source node information of the first data packet is used to identify the source node; and
the send, by the at least one forwarding node in the at least two forwarding nodes, a second data packet comprises:
send, by the at least one forwarding node in the at least two forwarding nodes, the second data packet based on any one or more of the following: the time information, the sequence number of the first data packet, the maximum quantity of forwarding times of the service data, or the source node information of the first data packet.

14. The non-transitory computer readable medium according to claim 12, wherein the operations further comprise:
storing the service data before learning that the second data packet is correctly received by at least one destination node in at least one of the destination node set or the destination node.

15. The apparatus according to claim 10, wherein the sending, by the at least one forwarding node in the at least two forwarding nodes, the second data packet based on any one or more of the following: the time information, the sequence number of the first data packet, the maximum quantity of forwarding times of the service data, or the source node information of the first data packet comprises:
sending, by the at least one forwarding node in the at least two forwarding nodes, the sending, by the at least one forwarding node in the at least two forwarding nodes, the second data packet when any one of the following operations is met:

determining, based on the valid time information of the service data, that the service data is valid;

determining, based on the sequence number of the first data packet, that the service data has not been forwarded by the at least one forwarding node in the at least two forwarding nodes;

the maximum quantity of forwarding times of the service data is greater than zero;

determining, based on the valid time information of the service data, that the service data is valid, and determining, based on the sequence number of the first data packet, that the service data has not been forwarded by the at least one forwarding node in the at least two forwarding nodes;

determining, based on the valid time information of the service data, that the service data determining, based on the valid time information of the service data, that the service data is valid, and the maximum quantity of forwarding times of the service data is greater than zero;

determining, based on the sequence number of the first data packet, that the service data has not been forwarded by the at least one forwarding node in the at least two forwarding nodes, and the maximum quantity of forwarding times of the service data is greater than zero; or determining, based on the valid time information of the service data, that the service data is valid, and determining, based on the sequence number of the first data packet, that the service data has not been forwarded by the at least one forwarding node in the at least two forwarding nodes, and the maximum quantity of forwarding times of the service data is greater than zero.

16. The apparatus according to claim 10, wherein, the second data packet meets any one of the following:

the second data packet comprises a maximum quantity of forwarding times of the service data, and the maximum quantity of forwarding times of the service data comprised in the second data packet satisfies an equation: the maximum quantity of forwarding times of the service data comprised in the second data packet=the maximum quantity of forwarding times of the service data comprised in the first data packet−1;

a sending time of the second data packet is determined by the at least one forwarding node in the at least two forwarding nodes based on the sending time of the second data packet comprised in the first data packet; or the second data packet comprises a maximum quantity of forwarding times of the service data, and the maximum quantity of forwarding times of the service data comprised in the second data packet satisfies an equation: the maximum quantity of forwarding times of the service data comprised in the second data packet=the maximum quantity of forwarding times of the service data comprised in the first data packet−1; and the sending time of the second data packet is determined by the at least one forwarding node in the at least two forwarding nodes based on the sending time information of the second data packet comprised in the first data packet.

17. The apparatus according to claim 10, wherein the operations further comprise:

determining, based on the valid time information of the service data comprised in the first data packet, that the service data is valid, and storing, by the at least one forwarding node in the at least two forwarding nodes, the service data; or when the at least one forwarding node in the at least two forwarding nodes determines, based on the sending time information of the second data packet comprised in the first data packet, that a sending time of the second data packet has not arrived, storing, by the at least one forwarding node in the at least two forwarding nodes, the service data.

18. The apparatus according to claim 9, wherein, the first data packet comprises information about at least one of a current node that sends the first data packet or a quality of service (QOS) requirement of the first data packet; and the information about the current node that sends the first data packet identifies the source node; and the quality of service (QOS) requirement of the first data packet identifies at least one of a priority requirement or a reliability requirement.

19. The apparatus according to claim 9, wherein, the second data packet comprises information about at least one of a current node that sends the second data packet or a quality of service (QOS) requirement of the second data packet; and the information about the current node that sends the second data packet identifies a forwarding node in the at least two forwarding nodes, and the forwarding node sends the second data packet, and the quality of service (QOS) requirement of the second data packet comprises at least one of a priority requirement or a reliability requirement.

20. The non-transitory computer readable medium according to claim 13, wherein the sending, by the at least one forwarding node in the at least two forwarding nodes, the second data packet based on any one or more of the following: the time information, the sequence number of the first data packet, the maximum quantity of forwarding times of the service data, or the source node information of the first data packet comprises:

sending, by the at least one forwarding node in the at least two forwarding nodes, the sending, by the at least one forwarding node in the at least two forwarding nodes, the second data packet when any one of the following operations is met:

determining, based on the valid time information of the service data, that the service data is valid;

determining, based on the sequence number of the first data packet, that the service data has not been forwarded by the at least one forwarding node in the at least two forwarding nodes;

the maximum quantity of forwarding times of the service data is greater than zero;

determining, based on the valid time information of the service data, that the service data determining, based on the valid time information of the service data, that the service data is valid, and the maximum quantity of forwarding times of the service data is greater than zero;

determining, based on the sequence number of the first data packet, that the service data has not been forwarded by the at least one forwarding node in the at least two forwarding nodes, and the maximum quantity of forwarding times of the service data is greater than zero; or determining, based on the valid time information of the service data, that the service data is valid, and determining, based on the sequence number of the first data packet, that the service data has not been forwarded by the at least one forwarding node in the at least two forwarding nodes, and the maximum quantity of forwarding times of the service data is greater than zero.

\* \* \* \* \*

UNITED STATES PATENT AND TRADEMARK OFFICE
CERTIFICATE OF CORRECTION

| | |
|---|---|
| PATENT NO. | : 11,792,124 B2 |
| APPLICATION NO. | : 17/098103 |
| DATED | : October 17, 2023 |
| INVENTOR(S) | : Yuanping Zhu, Jing Liu and Mingzeng Dai |

Page 1 of 1

It is certified that error appears in the above-identified patent and that said Letters Patent is hereby corrected as shown below:

In the Claims

In Claim 3, Column 33, Lines 32-35, delete "the service data, that the service data determining, based on the valid time information of the service data, that the service data is valid" and insert --based on the valid time information of the service data, that the service data is valid--.

In Claim 15, Column 37, Lines 18-20, delete "the service data, that the service data determining, based on the valid time information of the service data, that the service data is valid" and insert --based on the valid time information of the service data, that the service data is valid--.

In Claim 20, Column 38, Lines 60-62, delete "the service data, that the service data determining, based on the valid time information of the service data, that the service data is valid" and insert --based on the valid time information of the service data, that the service data is valid--.

Signed and Sealed this
Ninth Day of January, 2024

Katherine Kelly Vidal
*Director of the United States Patent and Trademark Office*